(12) United States Patent
Mori et al.

(10) Patent No.: US 9,739,364 B2
(45) Date of Patent: Aug. 22, 2017

(54) DIFFERENTIAL DEVICE

(71) Applicant: MUSASHI SEIMITSU INDUSTRY CO., LTD., Toyohashi-Shi, Aichi (JP)

(72) Inventors: Hiroyuki Mori, Toyohashi (JP); Naoya Nishimura, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 14/964,754

(22) Filed: Dec. 10, 2015

(65) Prior Publication Data

US 2016/0169370 A1    Jun. 16, 2016

(30) Foreign Application Priority Data

Dec. 12, 2014  (JP) ................................. 2014-251879
Oct. 7, 2015   (JP) ................................. 2015-199797
Nov. 13, 2015  (JP) ................................. 2015-223207

(51) Int. Cl.
*F16H 57/04* (2010.01)
*F16H 48/08* (2006.01)

(52) U.S. Cl.
CPC ......... *F16H 57/0483* (2013.01); *F16H 48/08* (2013.01); *F16H 57/043* (2013.01); *F16H 57/0427* (2013.01)

(58) Field of Classification Search
None
See application file for complete search history.

(56) References Cited

U.S. PATENT DOCUMENTS

| | | | | | |
|---|---|---|---|---|---|
| 1,913,842 A | * | 6/1933 | Manville | ................. | F16H 48/08 475/160 |
| 3,138,222 A | * | 6/1964 | Dames | ................ | F16H 57/0421 184/11.2 |
| 3,327,562 A | * | 6/1967 | Holdeman | .............. | F16H 48/08 192/107 R |
| 3,495,298 A | * | 2/1970 | Engle | ...................... | F16H 48/08 184/11.1 |
| 3,913,414 A | * | 10/1975 | Freiburger | .............. | F16H 48/08 475/86 |

(Continued)

FOREIGN PATENT DOCUMENTS

| | | | | |
|---|---|---|---|---|
| GB | 207729 A | * | 12/1923 | ............. F16H 48/08 |
| JP | S58-137644 A | | 8/1983 | |

(Continued)

*Primary Examiner* — Justin Holmes
(74) *Attorney, Agent, or Firm* — Carrier Blackman & Associates, P.C.; William D. Blackman; Joseph P. Carrier

(57) ABSTRACT

In a differential device, even when tooth portions of side gears are placed farther from output shafts due to increase in diameter of the side gears or even when a pinion rotates at high speed, seizure in meshing portions of the pinion and the side gears and a sliding portion of the pinion is prevented effectively. The side gears each include a shaft portion connected to corresponding one of the output shafts, and a flat intermediate wall portion integrally connecting the shaft portion and the tooth portion of the side gear separated outward from the shaft portion in a radial direction of an input member. A through oil passage is formed in the intermediate wall portion of at least one side gear, both ends of the through oil passage being respectively opened in inner and outer side surfaces of the intermediate wall portion.

16 Claims, 16 Drawing Sheets

(56) References Cited

U.S. PATENT DOCUMENTS

| | | | |
|---|---|---|---|
| 6,618,924 B1 * | 9/2003 | Irwin | F16H 48/08 29/407.01 |
| 6,964,629 B2 | 11/2005 | Tsung | |
| 9,140,352 B2 | 9/2015 | Inukai et al. | |
| 2001/0021680 A1 * | 9/2001 | Okada | F16H 48/08 475/83 |
| 2010/0234160 A1 * | 9/2010 | Ishikawa | F16H 48/08 475/161 |

FOREIGN PATENT DOCUMENTS

| | | |
|---|---|---|
| JP | H05-092567 U | 12/1993 |
| JP | 2005-048903 A | 2/2005 |
| JP | 2008-089147 A | 4/2008 |
| JP | 2011-038546 A | 2/2011 |
| JP | 4803871 B2 | 10/2011 |
| JP | 2013-228047 A | 11/2013 |

\* cited by examiner

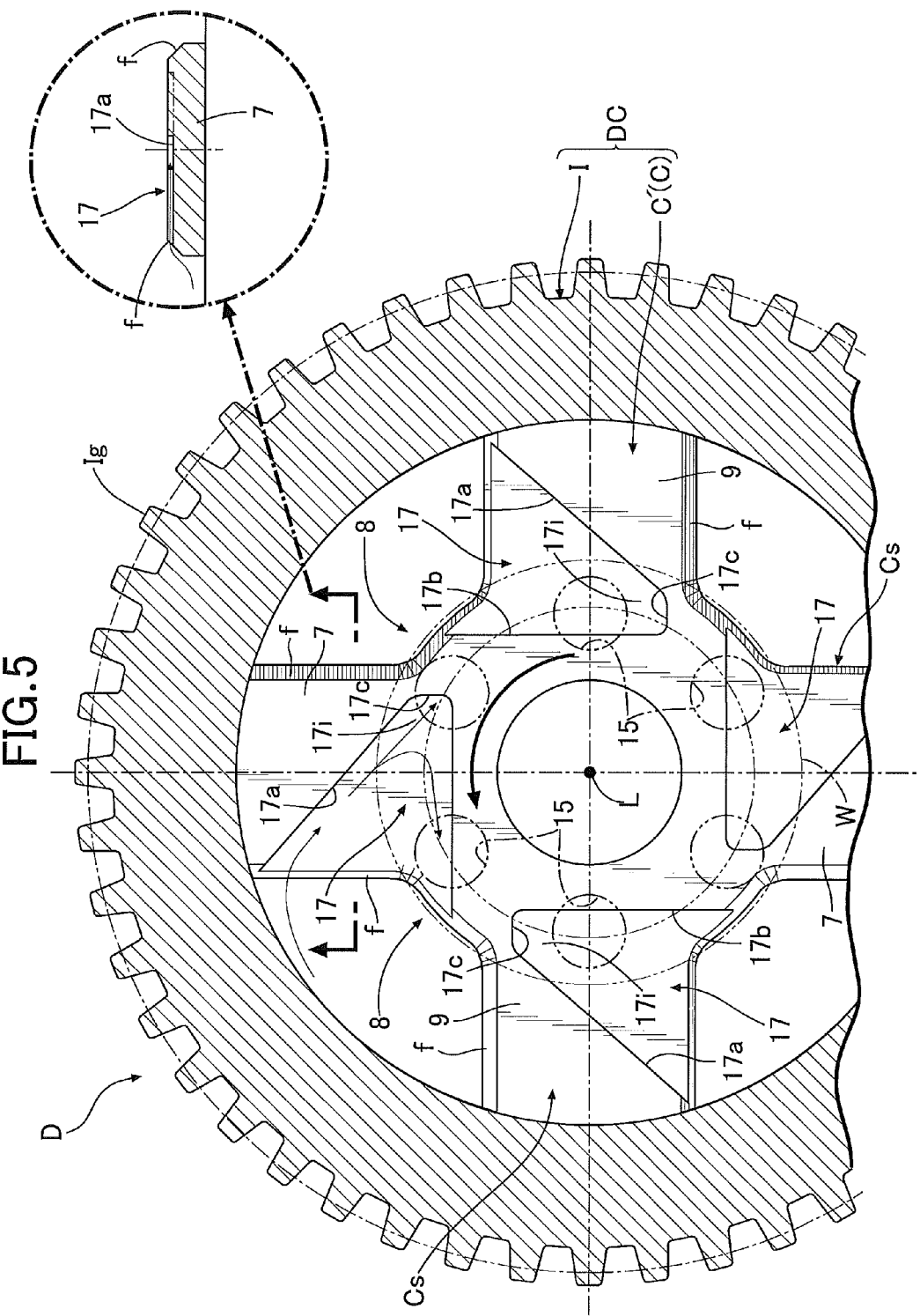

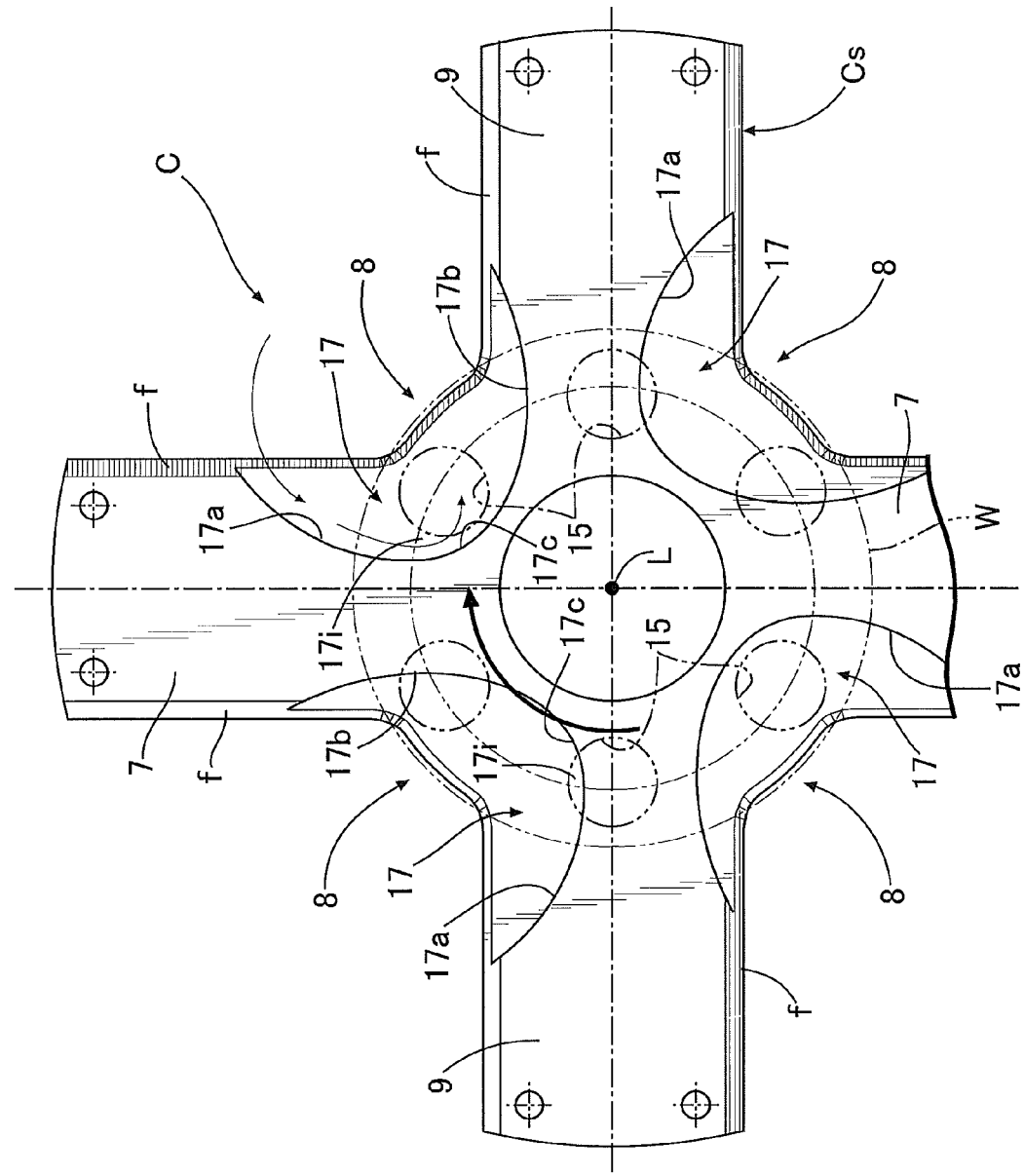

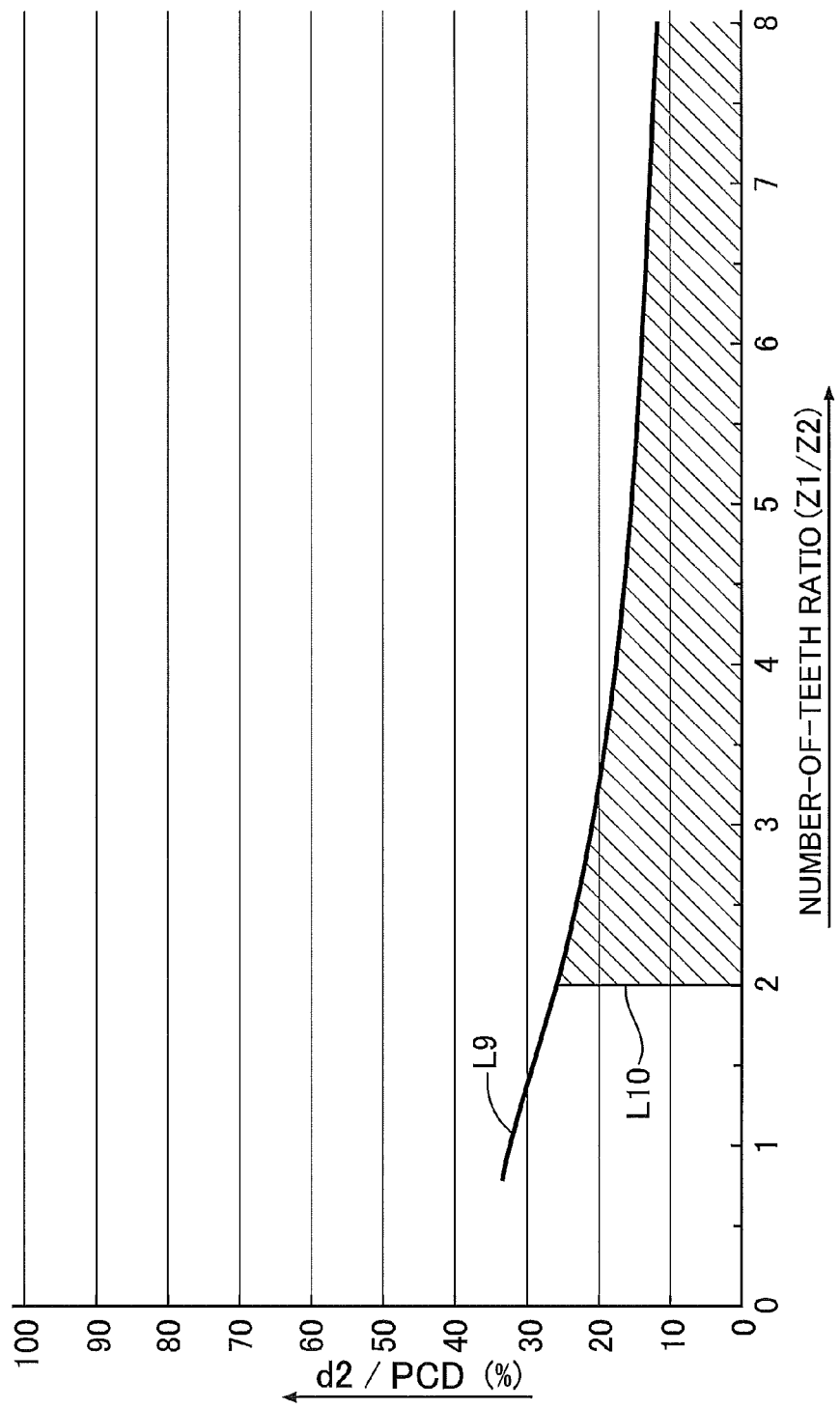

DIFFERENTIAL DEVICE

BACKGROUND OF THE INVENTION

Field of the Invention

The present invention relates to an improvement of a differential device, particularly the differential device which distributively transmits rotational force of an input member to a pair of output shafts via a pair of side gears (output gears), the input member supporting a pinion support portion (a differential gear support portion) that supports a pinion (a differential gear) and being rotatable together with the pinion support portion, the side gears each having a tooth portion in mesh with a pinion in an outer peripheral portion of each of the side gears.

Description of the Related Art

Conventionally, such a differential device has been publicly known as described in Japanese Patent Application Laid-open No. 2008-89147, for example. The conventional differential device is configured to supply lubricant oil to sliding portions of pinions and meshing portions of the pinions and side gears via clearances between back surfaces of the side gears and a differential case and via spline-fitting portions between inner peripheries of the side gears and outer peripheries of output shafts.

However, the conventional differential device, cannot efficiently collect and reserve a large amount of lubricant oil at the meshing portions of the pinions and the side gears. For this reason, the sliding portions of the pinions and the meshing portions of the pinions and the side gears are likely to have shortage of lubricant oil supply, for example, in a case where the meshing portions are placed farther from the output shafts due to an increase in the diameter of the side gears, or under severe driving conditions such as high-speed rotation of the pinions.

SUMMARY OF THE INVENTION

The present invention has been made with the foregoing situation taken into consideration. An object of the present invention is to provide a differential device capable of solving the above-mentioned problem.

In order to achieve the object, a differential device according to the present invention, distributively transmits rotational force of an input member to a pair of output shafts via a pair of side gears, the input member supporting a pinion support portion that supports a pinion and being rotatable together with the pinion support portion, the side gears each having a tooth portion in mesh with a pinion in an outer peripheral portion of each of the side gears, wherein the pair of side gears each include: a shaft portion connected to corresponding one of the pair of output shafts; and an intermediate wall portion integrally connecting the shaft portion and the tooth portion separated outward from the shaft portion in a radial direction of the input member and being formed in a flat shape, and a through oil passage is formed in the intermediate wall portion of at least one of the side gears, both ends of the through oil passage being respectively opened in an inner side surface and an outer side surface of the intermediate wall portion. (This is a first characteristic of the present invention.)

According to the first characteristic, the pair of side gears each include: the shaft portion connected to the corresponding one of the output shafts; and the intermediate wall portion integrally connecting the shaft portion and the tooth portion separated outward from the shaft portion in the radial direction of the input member and being formed in the flat shape. Thus, the diameter of each side gear can be made sufficiently larger than that of the pinion, so that the number of teeth of the side gear can be set sufficiently larger than the number of teeth of the pinion. This makes it possible to reduce load burden to the pinion support portion while torque is being transmitted from the pinion to the side gears, and thus to decrease an effective diameter of the pinion support portion, and accordingly a width of the pinion in the axial direction. Therefore, in combination with an effect of the flatness of the intermediate wall portions, the above-described decrease can contribute to a reduction of the width of the differential device in the axial direction. Furthermore, even if the tooth portions of the side gears are placed farther from the output shafts in the radial direction due to an increase in the diameter of the side gears as described above, the through oil passage is formed in the intermediate wall portion of at least one side gear, the both ends of the through oil passage being respectively opened in the inner side surface and the outer side surface of the intermediate wall portion. Thus, lubricant oil can flow from the outer side surface side into the inner side surface side of the side gear through the through oil passage, and the lubricant oil flowing into the inner side surface side can be efficiently supplied to the tooth portion in the outer periphery of the side gear, accordingly meshing portions of the side gear and the pinion, using centrifugal force. Thereby, even in the case where the tooth portions of the side gears are placed farther from the output shafts due to an increase in the diameter of the side gears, or even under severe driving conditions with high-speed rotation of the pinion, the lubricant oil can be sufficiently supplied to the meshing portions of the pinion and the side gears and a sliding portion of the pinion. Accordingly, seizure in the meshing portions and the sliding portion can be prevented effectively.

In the differential device according to the present invention, preferably, the device further comprises: a cover portion including a side wall portion which covers an outer side surface of at least one side gear and connected to the input member so as to rotate integrally with the input member; and a washer installed between an inner side surface of the side wall portion and the outer side surface of the side gear, wherein relative positions of the washer and the through oil passage are set such that at least an inner peripheral portion of the washer faces an opening portion of the through oil passage opened to the outer side surface of the intermediate wall portion. (This is a second characteristic of the present invention.)

According to the second characteristic, the differential device further comprises: the cover portion including the side wall portion which covers the outer side surface of at least one side gear and connected to the input member so as to rotate integrally with the input member; and the washer installed between the inner side surface of the side wall portion and the outer side surface of the side gear. The relative positions of the washer and the through oil passage are set such that at least the inner peripheral portion of the washer faces the opening portion of the through oil passage opened to the outer side surface of the intermediate wall portion. Thus, the washer inhibits the lubricant oil from flowing outward in the radial direction along a clearance between the inner side surface of the cover portion and the outer side surface of the side gear due to the centrifugal force, and thereby it is possible to guide the lubricant oil from the inner periphery side of the washer via the through oil passage toward the inner side of the side gear. This makes it possible to increase the amount of lubricant oil which passes through the through oil passage and flows toward the tooth portion in the outer periphery of the side gear along the inner side surface of the side gear, and accordingly to enhance an effect of lubricating the meshing portions and the like. Moreover, since the washer serves also as oil guiding means for guiding the lubricant oil to the through oil passage, the structure can be simplified and thereby it is possible to contribute to cost reduction.

In the differential device according to the present invention, preferably, a washer retaining groove fitting and retaining the washer is formed in at least one of mutually-facing surfaces of the inner side surface of the side wall portion and the outer side surface of the side gear. (This is a third characteristic of the present invention.)

According to the third characteristic, the washer retaining groove is formed in at least one of the mutually-facing surfaces of the inner side surface of the side wall portion of the cover portion and the outer side surface of the side gear. Thus, the washer can be stably retained in an appropriate fixed position in consideration of a lubricant oil passage to the through oil passage.

In the differential device according to the present invention, preferably, the side wall portion includes a lightening portion exposing the outer side surface of the side gear, and an oil guide groove is provided in a recess shape in the inner side surface of the side wall portion, the oil guide groove being capable of guiding flow of lubricant oil from a peripheral edge of the lightening portion toward the washer and the through oil passage during rotation of the input member. (This is a fourth characteristic of the present invention.)

According to the fourth characteristic, the side wall portion of the cover portion includes the lightening portion exposing the outer side surface of the side gear, and the oil guide groove is provided in a recess shape in the inner side surface of the side wall portion, the oil guide groove being capable of guiding the flow of lubricant oil from the peripheral edge of the lightening portion toward the washer and the through oil passage during the rotation of the input member. Thus, due to an oil guiding effect of the oil guide groove, the flow of the lubricant oil from the peripheral edge of the lightening portion toward the washer and the through oil passage can be efficiently guided using the rotation of the input member. Accordingly, an effect of lubricating the washer is enhanced. In addition, the amount of lubricant oil flowing through the through oil passage toward the tooth portions in the outer peripheries of the side gears can be more effectively increased, and an effect of lubricating the meshing portions and the like can be further enhanced.

In addition, in order to achieve the object, a differential device according to the present invention, distributively transmits rotational force of an input member to a pair of output shafts via a pair of output gears, the input member supporting a differential gear support portion that supports a differential gear and being rotatable together with the differential gear support portion, the output gears each having a tooth portion in mesh with a differential gear in an outer peripheral portion of each of the output gears, wherein the pair of output gears each include: a shaft portion connected to corresponding one of the pair of output shafts; and an intermediate wall portion integrally connecting the shaft portion and the tooth portion separated outward from the shaft portion in a radial direction of the input member and being formed in a flat shape, and a through oil passage is formed in the intermediate wall portion of at least one of the output gears, both ends of the through oil passage being respectively opened in an inner side surface and an outer side surface of the intermediate wall portion, wherein $$d2/PCD \leq 3.36 \cdot \left(\frac{1}{z1}\right)^{\frac{2}{3}} \cdot \sin\left(\tan^{-1}\frac{z1}{z2}\right)$$

is satisfied, and

Z1/Z2>2 is satisfied, where Z1, Z2, d2 and PCD denote the number of teeth of each of the output gears, the number of teeth of the differential gear, a diameter of the differential gear support portion and a pitch cone distance, respectively. (This is a fifth characteristic of the present invention.)

According to the fifth characteristic, the pair of output gears each include: the shaft portion connected to the corresponding one of the output shafts; and the intermediate wall portion integrally connecting the shaft portion and the tooth portion separated outward from the shaft portion in the radial direction of the input member and being formed in the flat shape. Thus, the diameter of each output gear can be made sufficiently larger than that of the differential gear, so that the number of teeth of the output gear can be set sufficiently larger than the number of teeth of the differential gear. This makes it possible to reduce load burden to the differential gear support portion while torque is being transmitted from the differential gear to the output gears, and thus to decrease an effective diameter of the differential gear support portion, and accordingly a width of the differential gear in the axial direction. Therefore, in combination with an effect of the flatness of the intermediate wall portions, the above-described decrease can contribute to a reduction of the width of the differential device in the axial direction. Furthermore, even if the tooth portions of the output gears are placed farther from the output shafts in the radial direction due to an increase in the diameter of the output gears as described above, the through oil passage is formed in the intermediate wall portion of at least one output gear, the both ends of the through oil passage being respectively opened in the inner side surface and the outer side surface of the intermediate wall portion. Thus, lubricant oil can flow from the outer side surface side into the inner side surface side of the output gear through the through oil passage, and the lubricant oil flowing into the inner side surface side can be efficiently supplied to the tooth portion in the outer periphery of the output gear, accordingly meshing portions of the output gear and the differential gear, using centrifugal force. Thereby, even in the case where the tooth portions of the output gears are placed farther from the output shafts due to an increase in the diameter of the output gears, or even under severe driving conditions with high-speed rotation of the differential gear, the lubricant oil can be sufficiently supplied to the meshing portions of the differential gear and the output gears and a sliding portion of the differential gear. Accordingly, seizure in the meshing portions and the sliding portion can be prevented effectively. Moreover, according to the fifth characteristic, the differential device as a whole can be sufficiently reduced in width in the axial direction of the output shafts while securing the strength (for example, the static torsion load strength) and the maximum amount of torque transmission at approximately same levels as the conventional differential device. Accordingly, the differential device can be easily incorporated in a transmission system, which is under many layout restrictions around the differential device, with great freedom and no specific difficulties, and is therefore advantageous in reducing the size of the transmission system.

In the differential device according to the present invention, preferably, Z1/Z2≥4 is satisfied. (This is a sixth characteristic of the present invention.)

In the differential device according to the present invention, preferably, $Z1/Z2 \geq 5.8$ is satisfied. (This is a seventh characteristic of the present invention.)

According to the sixth and seventh characteristics, the differential device can be more sufficiently reduced in width in the axial direction of the output shafts while securing the strength (for example, the static torsion load strength) and the maximum amount of torque transmission at approximately the same levels as the conventional differential device.

The above and other objects, characteristics and advantages of the present invention will be clear from detailed descriptions of the preferred embodiments which will be provided below while referring to the attached drawings.

BRIEF DESCRIPTION OF THE DRAWINGS

FIG. 5 is a sectional view taken along a 5-5 line in FIG. 1 with only the other cover portion C' and an input member drawn with solid lines.

FIG. 7 is a view showing a modified embodiment of the cover portion where only the shapes of oil guide grooves are different from those shown in FIG. 4, and corresponding to FIG. 4.

FIG. 16 is a graph showing a relationship between the shaft diameter/pitch cone distance ratio and the number-of-teeth ratio where the number of teeth of the pinion is set at 20.

DESCRIPTION OF THE PREFERRED EMBODIMENTS

Figure 1:
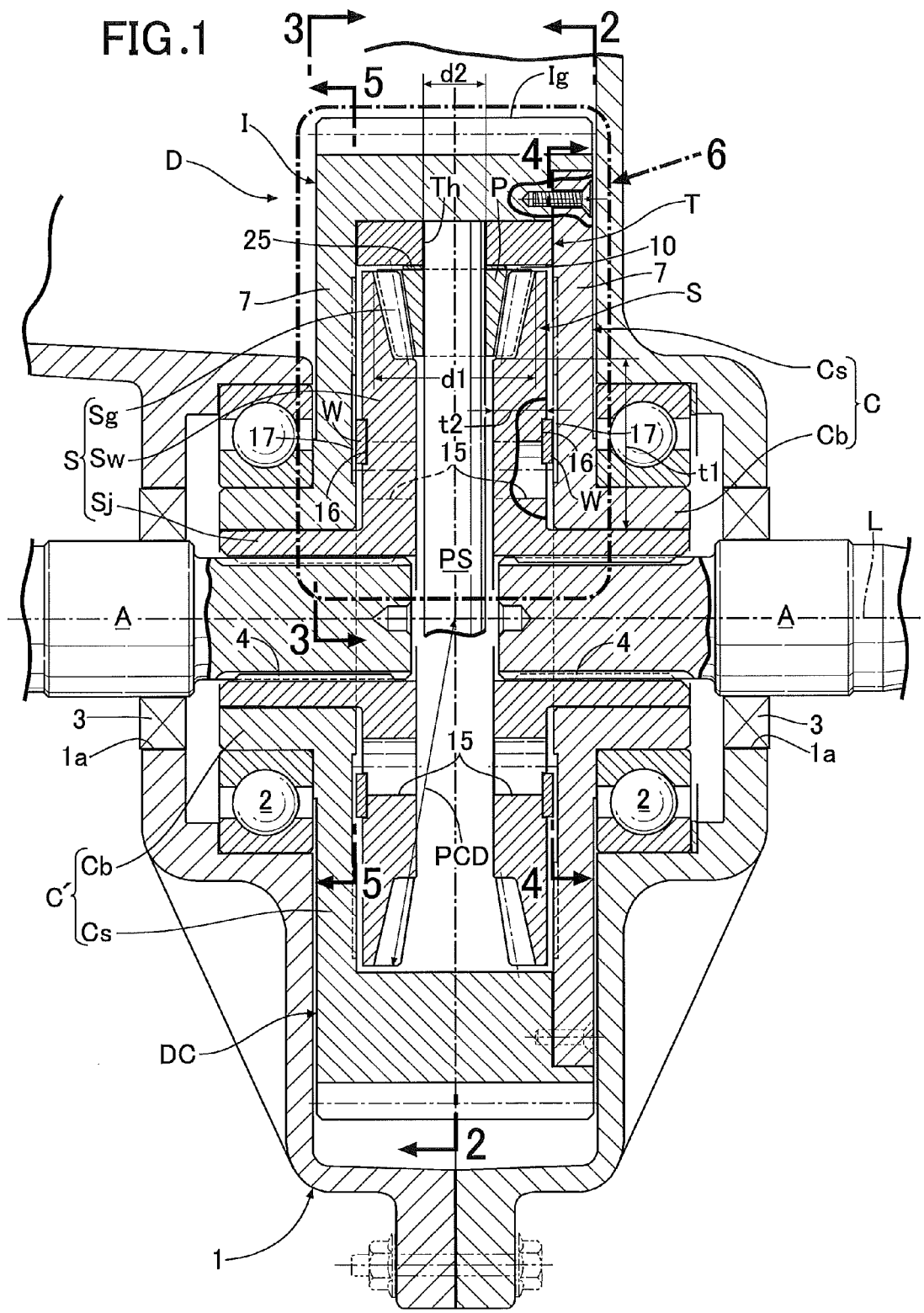
FIG. 1 is a longitudinal sectional view of a differential device according to a first embodiment of the present invention and its vicinity (a sectional view taken along a 1-1 line in FIG. 2).

Embodiments of the present invention will be hereinbelow described based on preferred examples of the present invention which are shown in the attached drawings.

First of all, descriptions will be provided for a first embodiment of the present invention illustrated in FIGS. 1 to 7. A differential device D drives a pair of left and right axles while allowing their differential rotation by distributively transmitting, to a pair of left and right output shafts A, rotational driving force which is transmitted from an engine (not illustrated) mounted on an automobile, the pair of left and right output shafts A being continuous to the pair of left and right axles. The differential device D is housed and supported, for example, inside a transmission case 1 disposed beside the engine in a front portion of a vehicle body.

The differential mechanism D includes: a plurality of pinions (differential gears) P; a pinion shaft PS as a pinion support portion (a differential gear support portion) rotatably supporting the pinions P; an input member I supporting the pinion shaft PS so as to be rotatable together with the pinion shaft PS and having a short cylindrical shape; a pair of left and right side gears (output gears) S being in mesh with the pinions P from both the left and right sides and connected respectively to the pair of left and right output shafts A; and a pair of left and right cover portions C, C' covering outer sides of the respective side gears S and rotating integrally with the input member I. A differential case DC is formed from the input member I and the cover portions C, C'.

Incidentally, the embodiment shows the differential device D which includes two pinions P, and whose pinion shaft PS as the pinion support portion is formed in a linear rod shape extending along one diameter line of the input member I with the two pinions P respectively supported by both end portions of the pinion shaft PS. Instead, the differential device D may include three or more pinions P. In this case, the pinion shaft PS is formed in a shape of crossing rods such that rods extend radially from a rotation axis L of the input member I in three or more directions corresponding to the three or more pinions P (for example, in a shape of a cross when the differential device D includes four pinions P), and tip end portions of the extending rods of the pinion shaft PS support the pinions P, respectively.

In addition, the pinions P may be fitted to the pinion shaft PS directly as shown in the illustrated example, or a bearing means (not illustrated), such as a bearing bush and the like, may be inserted between the pinion shaft PS and each pinion P. Furthermore, the pinion shaft PS may be formed in a shape of a shaft whose diameter is substantially equal throughout its whole length, or formed in a shape of a stepped shaft. Furthermore, recessed portions to be used as oil passages may be provided to outer peripheral surfaces of the pinion shaft PS which are fitted to the pinions P, respectively.

The differential case DC is rotatably supported by the transmission case 1 via left and right bearings 2. Moreover, through-holes 1a inserted with the output shafts A are formed in the transmission case 1. Seal members 3 sealing interstices between inner peripheries of the through-holes 1a and outer peripheries of the output shafts A and being formed in an annular shape are interposed between the inner peripheries and the outer peripheries. Furthermore, an oil pan (not illustrated) facing an inner space of the transmission case 1 and reserving a predetermined amount of lubricant oil is provided in a bottom portion of the transmission case 1. When the lubricant oil reserved in the oil pan is scattered around the differential device D in the transmission case 1 by rotation of the differential case DC and the other rotary members, mechanical interlocking sections existing inside and outside the differential case DC can be lubricated.

An input tooth portion Ig as a final driven gear is provided in an outer peripheral portion of the input member I. The input tooth portion Ig is in mesh with a drive gear (not illustrated) which is rotationally driven by power of the engine. Incidentally, in the embodiment, the input tooth portion Ig is directly formed in an outer peripheral surface of the input member I over a full lateral width of the input member I (i.e., an overall axial width of the input member I). Instead, however, the input tooth portion Ig may be formed to have the width smaller than that of the input member I. Otherwise, the input tooth portion Ig may be formed separately from the input member I, and thereafter fixed to the outer peripheral portion of the input member I.

Meanwhile, in the embodiment, the pinions P and the side gears S are each formed as a bevel gear. In addition, each pinion P as a whole and each side gear S as a whole, including their tooth portions, are formed by plastic working such as forging and the like. For these reasons, their tooth portions with an arbitrary gear ratio can be precisely formed without restriction in machining work such that the tooth portions of the pinions P and the side gears S are formed by cutting work. Incidentally, other types of gears may be used instead of the bevel gear. For example, a face gear may be used for the side gears S, while a spur gear or a helical gear may be used for the pinions P.

In addition, the pair of side gears S each include: a shaft portion Sj to which an inner end portion of the corresponding one of the pair of output shafts A is connected by being spline-fitted as at 4 and being formed in a cylindrical shape; a tooth portion Sg situated at a position separated outward from the shaft portion Sj in a radial direction of the input member I, being in mesh with the corresponding pinion P and being formed in an annular shape; and an intermediate wall portion Sw formed in a flat ring plate shape orthogonal to the axis L of the output shafts A and integrally joining the shaft portion Sj and the tooth portion Sg.

Through oil passages 15 penetrating through the intermediate wall portion Sw are formed in the intermediate wall portion Sw of at least one side gear S (both the side gears S, in this embodiment), both ends of each through oil passage 15 being respectively opened in inner and outer side surfaces of the intermediate wall portion Sw. Incidentally, in the embodiment, each through oil passage 15 is formed as a circular hole whose center axis is in parallel with the axis L of the output shafts A. Nevertheless, the cross-sectional shape of the through oil passage 15 is not limited to that shown in the illustrated example, but may be any of various shapes such as a fan shape, an elliptic shape, a polygonal shape and a quadrangular shape. Furthermore, the center axis of the through oil passage 15 does not have to be in parallel with the axis L of the output shafts A. For example, the through oil passage 15 may be provided inclined to the axis L of the output shafts A such that as the center axis of the through oil passage 15 approaches the inner side surface of the corresponding side gear S, the center axis thereof is inclined outward in the radial direction of the side gear S. In this case, it is possible to further promote the flow of the lubricant oil via the through oil passage 15 toward the tooth portion Sg in the outer periphery of the side gear S (accordingly toward the corresponding pinion P).

The intermediate wall portion Sw of the side gear S is formed with a width t1 of the intermediate wall portion Sw in the radial direction larger than a maximum diameter d1 of the pinion P, and with a maximum thickness t2 of the intermediate wall portion Sw in an axial direction of the output shafts A smaller than an effective diameter d2 of the pinion shaft PS (see FIG. 1). Thereby, as described later, a diameter of the side gear S can be made large enough to set the number Z1 of teeth of the side gear S sufficiently larger than the number Z2 of teeth of the pinions P, and the side gear S can be sufficiently thinned in the axial direction of the output shafts A. Incidentally, the present specification defines the "effective diameter d2" as an outer diameter d2 of a shaft (i.e., the pinion shaft PS, or a later-described support shaft portion PS') as the pinion support portion which is formed separately from or integrally with the pinions P, supports the pinions P and is attached to the input member I.

Moreover, the cover portion C, which is one of the pair of cover portions C, C', is formed separately from the input member I, and is detachably connected to the input member I using bolts b. However, as connecting means of the one cover portion C, various connecting means other than screwing means, such as welding means and crimping means, can be also used. Meanwhile, the other cover portion C' is formed integrally with the input member I. Incidentally, like the one cover portion C, the other cover portion C' may be formed separately from the input member I, and connected to the input member I using bolts b or other connecting means.

Besides, each of the cover portions C, C' includes: a boss portion Cb which concentrically surrounds the shaft portion Sj of the side gear S and in which the shaft portion Sj is rotatably fitted and supported and being formed in a cylindrical shape; and a side wall portion Cs formed in a plate shape and having an outer side surface which is a flat surface orthogonal to the rotation axis L of the input member I, the side wall portion Cs being integrally connected to an inner end in an axial direction of the boss portion Cb. The side wall portions Cs of the cover portions C, C' are disposed within the width of the input member I (accordingly, the input tooth portion Ig) in the axial direction of the output shafts A. This inhibits the side wall portions Cs of the cover portions C, C' from protruding outward in the axial direction from an end surface of the input member I, and is thus advantageous in making a width of the differential device D narrower in the axial direction of the output shafts A.

In addition, by inner side surfaces of the side wall portions Cs of the cover portions C, C', back surfaces of at least one (the intermediate wall portions Sw, in the illustrated example) of the intermediate wall portions Sw and the tooth portions Sg of the side gears S are rotatably supported via washers W, respectively. Incidentally, such washers W may be omitted so that by the inner side surfaces of the side wall portions Cs, the back surfaces of the side gears S are rotatably and directly supported, respectively. Furthermore, the shaft portions Sj of the side gears S may be supported by the boss portions Cb of the cover portions C, C' via bearings, respectively.

Figure 6A:
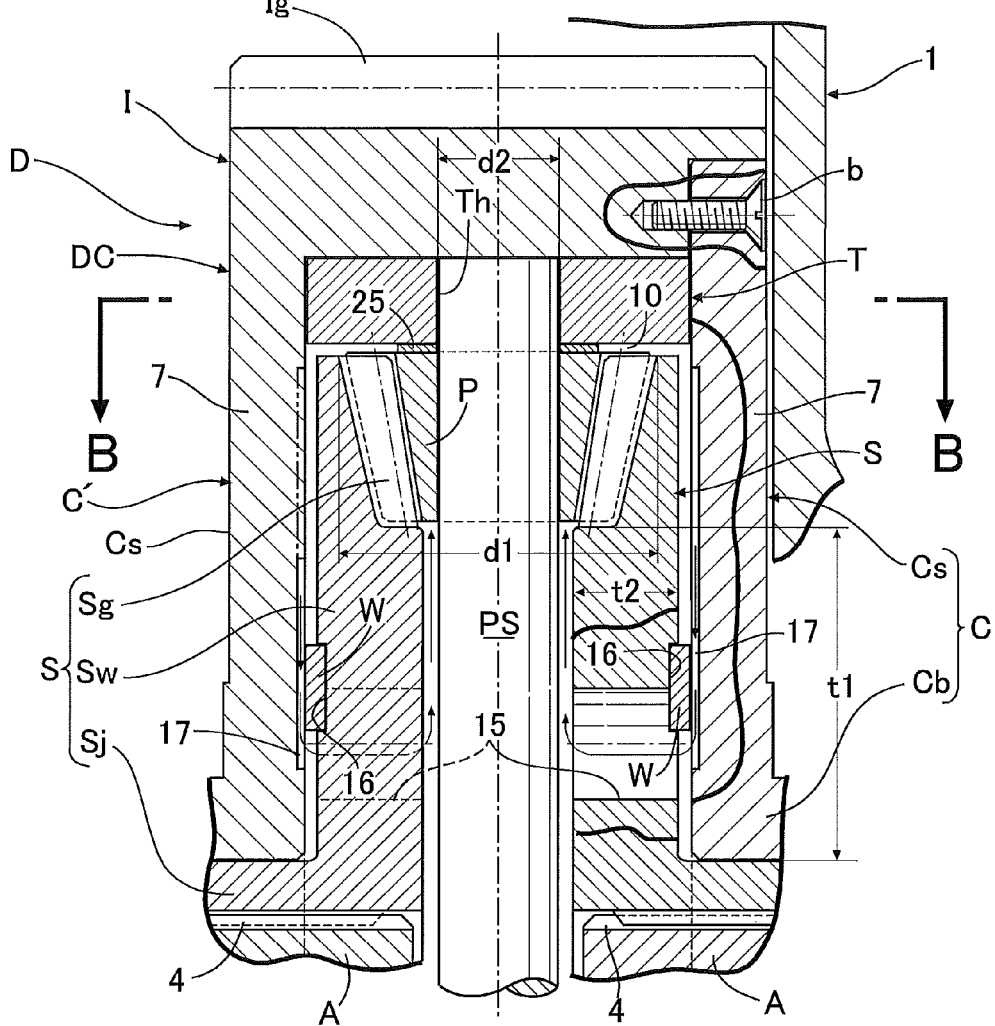
FIG. 6A is an enlarged view of a part indicated with an arrow 6 in FIG. 1
Figure 6B:
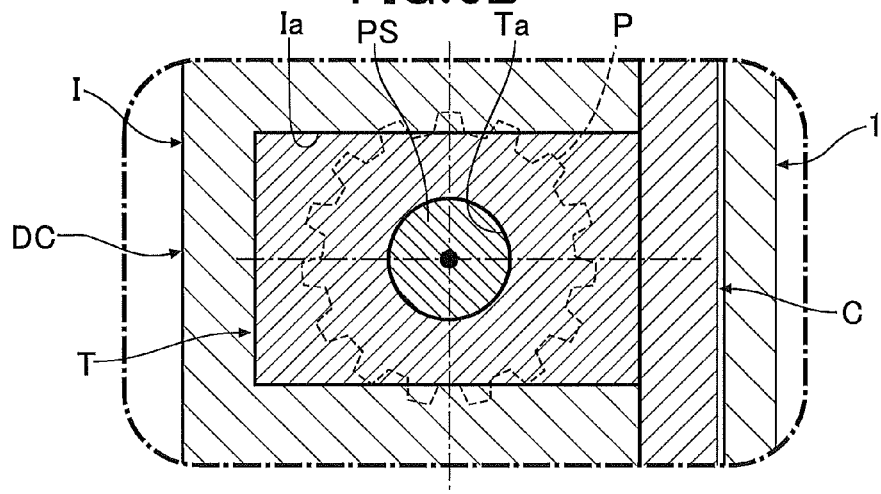
FIG. 6B is a sectional view taken along a B-B line in FIG. 6A.

Next, with reference to FIGS. 6A and 6B together, descriptions will be provided for a structure for attaching the pinion shaft PS, as the pinion support portion, to the input member I. The pinion shaft PS has both end portions which are connected to and supported by the input member I via attachment bodies T. A retaining hole Th is formed in each attachment body T (see FIG. 1), the retaining hole Th being able to be fitted therein with and retain an entire periphery of the corresponding end portion of the pinion shaft PS. Furthermore, attachment grooves Ia each having a cross section with an angular U-shape are provided in a recess shape in the inner peripheral surface of the input member I, each of the attachment grooves Ia having an opening in a side surface of the input member I on the one cover portion C side and extending in the axial direction of the output shafts A. Each attachment body T having a rectangular parallelepiped shape is inserted into the corresponding attachment groove Ia from the opening of the attachment groove Ia. The attachment body T is fixed to the input member I by fastening the one cover portion C to the input member I using the bolts b, with the attachment body T inserted in the attachment groove Ia of the input member I. In addition, thrust washers 25 are installed between the attachment bodies T and large diameter-side end surfaces of the pinions P, the thrust washers 25 allowing relative rotation therebetween and being formed in an annular shape.

The above-described structure for attaching the pinion shaft PS to the input member I enables the pinion shaft PS to be easily and firmly connected and fixed to the attachment grooves Ia in the input member I by use of the block-shaped attachment bodies T in which the entire peripheries of the end portions of the pinion shaft PS are fitted and retained. For this reason, the pinion shaft PS can be connected to and supported by the input member I with high strength, with no specialized through-hole for supporting the pinion shaft PS formed in the input member I, and without decreasing assembly workability. Furthermore, the embodiment achieves structure simplification since the cover portion C covering the outer side of the corresponding side gear S concurrently serves as the fixing means for retaining the attachment body T.

Thereby, when the both end portions of the pinion shaft PS are connected to and supported by the input member I via the attachment bodies T, clearances 10 in the radial direction of the input member I are formed between the large diameter-side end surfaces of the pinions P rotatably supported by the pinion shaft PS and the inner peripheral surface of the input member I. This makes it easy for the lubricant oil to be reserved in the clearances 10, and is accordingly effective to prevent seizure in end portions of the pinions P facing the clearances 10 and their vicinities.

Figure 2:
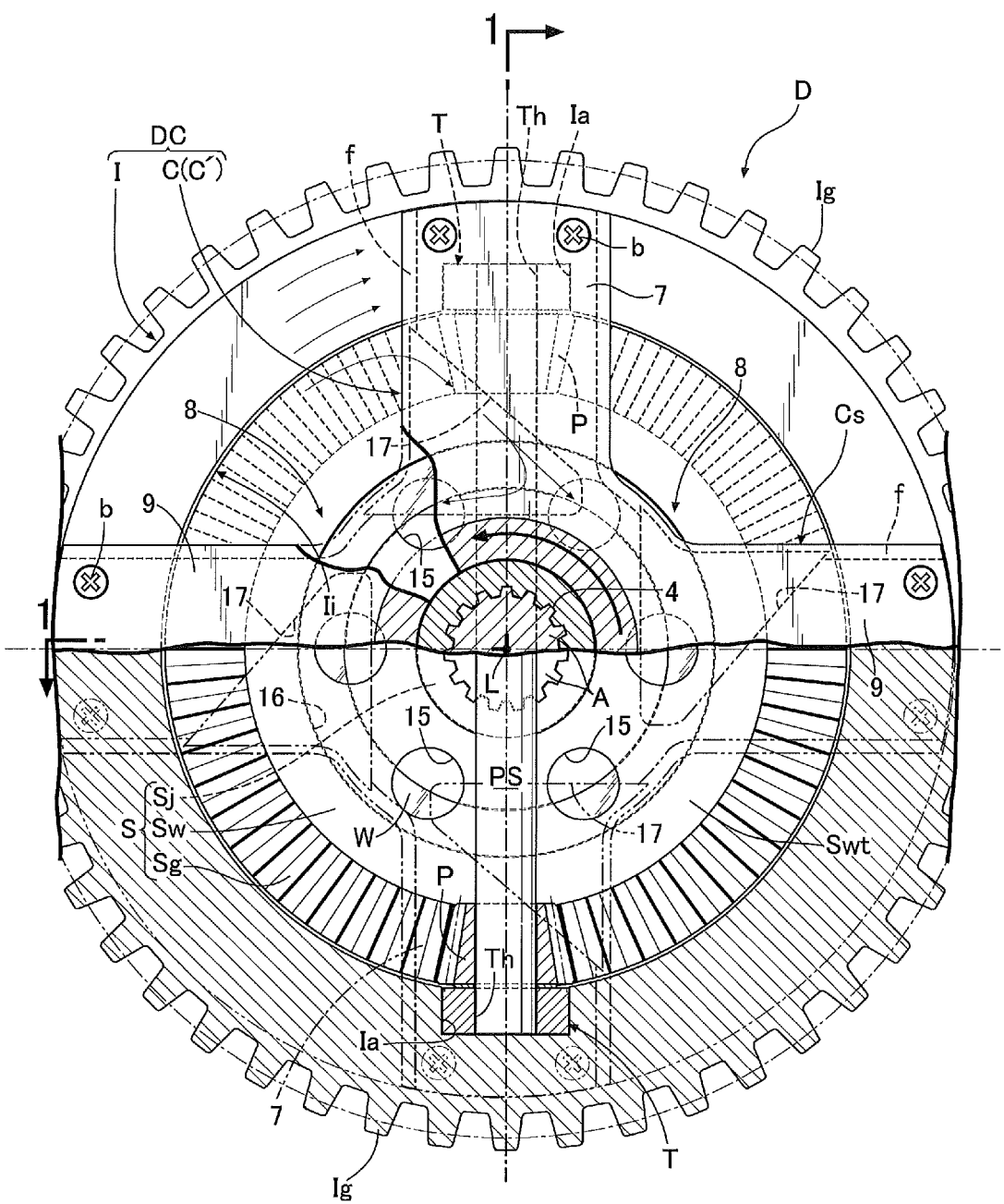
FIG. 2 is a partial cutaway side view on an axial one side of the differential device according to the first embodiment of the present invention (a sectional view taken along a 2-2 line in FIG. 1).

Meanwhile, the side wall portion Cs of the one cover portion C has a structure having oil retaining portions 7 covering a back surface of the side gear S in first predetermined areas including areas which overlap the pinions P as seen in a side view from outside in the axial direction of the output shafts A (i.e., as seen in FIG. 2), having lightening portions 8 exposing the back surface of the side gear S to the outside of the differential case DC in second predetermined areas which do not overlap the pinions P as seen in the side view and having connecting arm portions 9 being separated from the oil retaining portions 7 in the peripheral direction of the input member I and extending in the radial direction of the input member I to connect the boss portion Cb and the input member I. In other words, the side wall portion Cs basically having a disk shape in the cover portion C has a structural form in which: the plurality of lightening portions 8 each having a cutout shape are formed in the side wall portion Cs at intervals in the peripheral direction; and thereby, one oil retaining portion 7 and one connecting arm portion 9 are formed respectively on opposite sides of the lightening portion 8 in the peripheral direction.

The structural form of the side wall portion Cs of the cover portion C, particularly the oil retaining portions 7, makes it possible for the lubricant oil, which tends to move outward in the radial direction due to centrifugal force produced by rotation of the input member I, to be easily stayed in spaces covered by the oil retaining portions 7 and the input member I, and to be easily retained on the pinions P and in their vicinities. In addition, since the cover portion C includes the lightening portions 8, the lubricant oil can be distributed to the inside and outside of the differential case DC via the lightening portions 8. Thus, the lubricant oil is changed and cooled appropriately, thereby effectively preventing degradation of the lubricant oil. Furthermore, since a large amount of lubricant oil need not be confined inside the differential case DC, and since the cover portion C itself is reduced in weight by an amount of the forming of the lightening portions 8, reduction in the weight of the differential device D can be accordingly achieved.

It should be noted that although in the embodiment, the lightening portions 8 are each formed in the cutout shape which is opened on the outer peripheral end side of the side wall portion Cs, the lightening portions 8 may be instead each formed in a through-hole shape which is not opened on the outer peripheral end side thereof.

Figure 3:
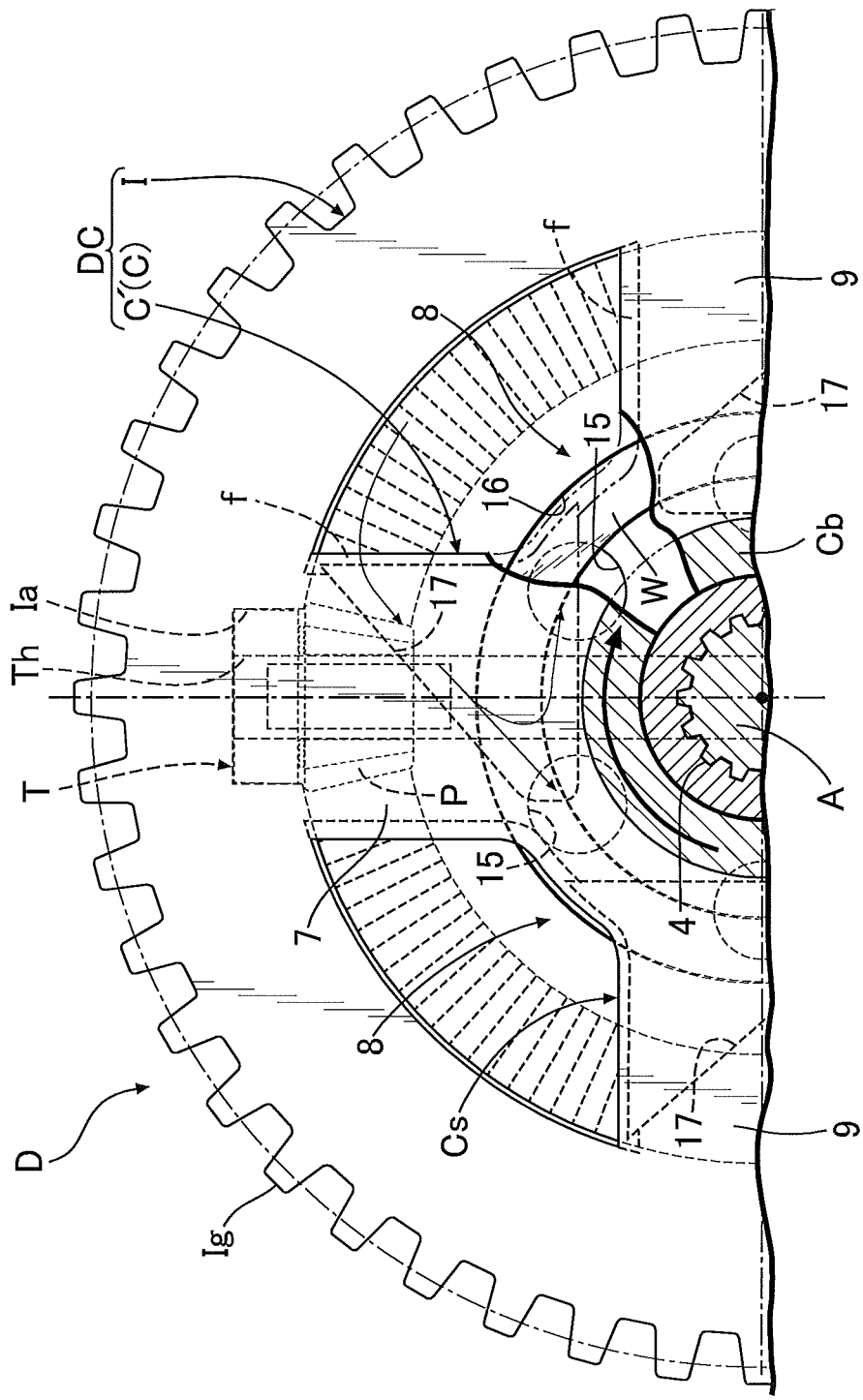
FIG. 3 is a side view of a main part on an axial other side of the differential device according to the first embodiment of the present invention (a sectional view taken along a 3-3 line in FIG. 1).

Furthermore, in the embodiment, as shown in FIG. 3, the lightening portions 8 are formed also in the other cover portion C', as in the one cover portion C. However, in the side wall portion Cs of the other cover portion C', the oil retaining portions 7 and the connecting arm portions 9 are integrally formed in the input member I. Incidentally, the side wall portion Cs of one of the cover portions C, C' may be formed in a disk shape with no lightening portion (accordingly, covering entirely the back surfaces of the intermediate wall portion Sw and the tooth portion Sg of the corresponding side gear S).

It should be noted that the structure for connecting the oil retaining portions 7 and the connecting arm portions 9 to the input member I has been described as the structure for connecting the cover portions C, C' to the input member I. In other words, the oil retaining portions 7 and the connecting arm portions 9 may be formed integral with the input member I. Otherwise, in a case where the oil retaining portions 7 and the connecting arm portions 9 are formed separately from the input member I, the oil retaining portions 7 and the connecting arm portions 9 may be connected to the input member I using the screwing means such as the bolts b and the like, as in the embodiment, or other various connecting means (for example, welding means, crimping means and the like).

Meanwhile, as described above, the washers W are installed between the inner side surfaces of the side wall portions Cs of the cover portions C, C' and the outer side surfaces of the side gears S, respectively. For the purpose of positioning and retaining the washers W at appropriate fixed positions in consideration of lubricant oil passages to the through oil passages 15, washer retaining grooves 16 each having an annular shape are formed in at least one of the inner side surfaces of the side wall portions Cs and the outer side surfaces of the side gears S (the outer side surfaces of the side gears S in the illustrated example). The washers W are fitted to the washer retaining grooves 16.

Subsequently, the relative positions of the washers W and the through oil passages 15 are set such that radially inner peripheral portions of the washers W are substantially aligned with the openings of the through oil passages 15 opened to the outer side surfaces of the intermediate wall portions Sw. As seen in FIGS. 1-3 and 6A, the washers W are situated and arranged in the differential device D in a manner so that an opening of each of the through oil passages, proximate the cover C, is partially occluded by a corresponding washer. Thereby, the washers W inhibit the flow of the lubricant oil which tends to flow outward in the radial direction, along the clearances between the inner side surfaces of the side wall portions Cs of the cover portions C, C' and the outer side surfaces of the side gears S, due to the centrifugal force. Thus, the flow of the lubricant oil can be guided from the inner peripheries of the washers W, via the through oil passages 15, toward the inner sides of the side gears S. For this reason, it is possible to increase the amount of lubricant oil which passes through the through oil passages 15 and flows toward the tooth portions Sg along the inner side surfaces of the side gears S.

Figure 4:
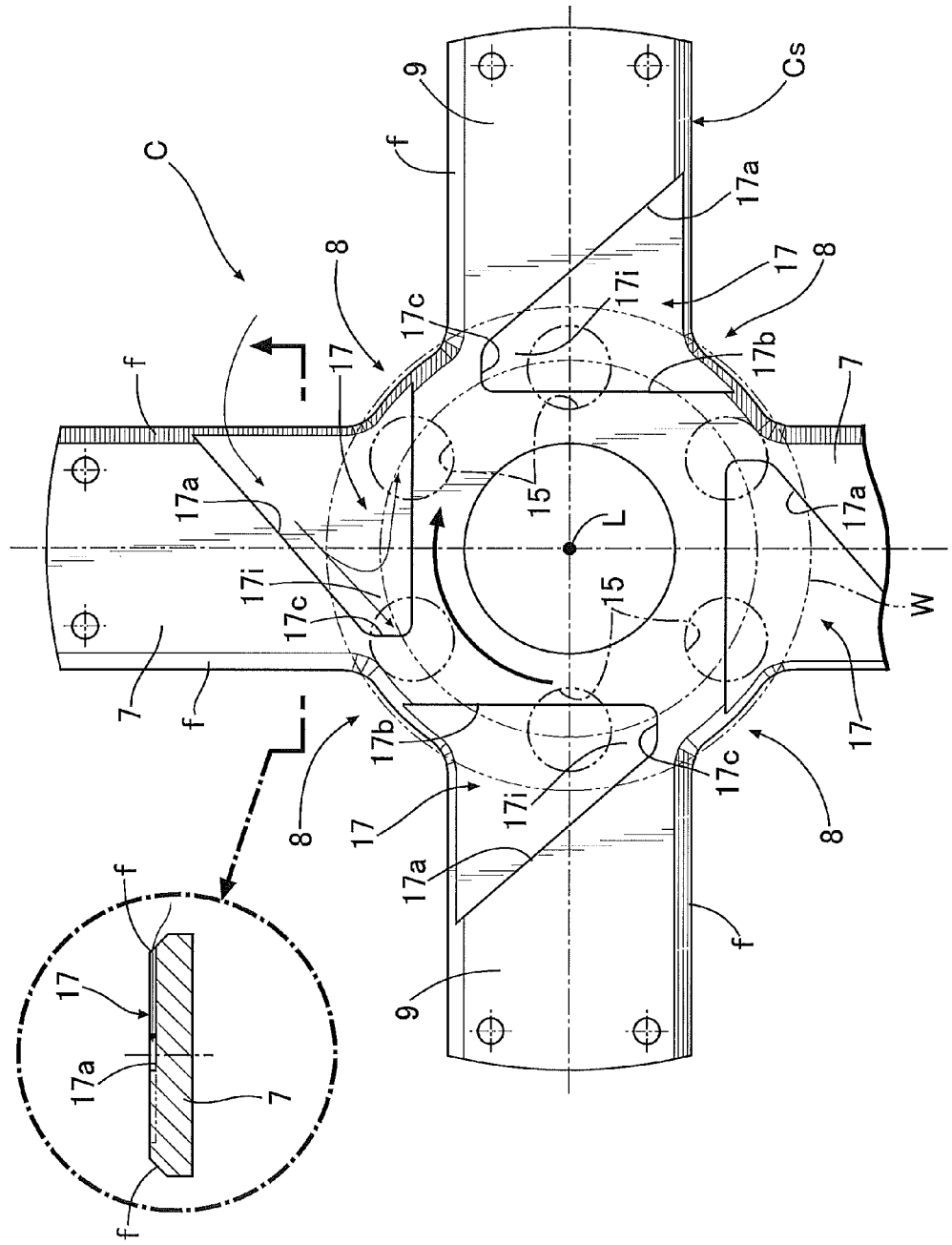
FIG. 4 is a sectional view taken along a 4-4 line in FIG. 1 with only one cover portion C drawn with solid lines.

In addition, referring to FIGS. 4 and 5 together, oil guide grooves 17 are recessed in the inner side surfaces of the side wall portions Cs of the cover portions C, C', the oil guide grooves 17 being capable of guiding the flow of the lubricant oil from peripheral edges of the lightening portions 8 toward the washers W and the through oil passages 15 during rotation of the input member I. Each oil guide groove 17 is formed in a substantially triangle shape by a first inner wall 17a, a second inner wall 17b and a back wall portion 17c, the first inner wall 17a obliquely extending with respect to a tangent direction of the corresponding oil retaining portion 7 (more concretely, obliquely extending to the center axis L side as going backward in a normal rotation direction to be described later of the input member I) from the peripheral edge of the corresponding lightening portion 8, the second inner wall 17b similarly extending in the tangent direction of the oil retaining portion 7, and the back wall portion 17c connecting inner ends of the both inner walls 17a, 17b to each other.

Furthermore, inner back groove portions 17i faced by the back wall portions 17c in the oil guide grooves 17 are respectively disposed in positions capable of always overlapping parts of the washer W as seen in a projection plane orthogonal to the rotation axis L of the input member I and also temporarily overlapping the openings of the through oil passages 15 to the outer side surface of the intermediate wall portion Sw in accordance with the rotation of the input member I, as seen in the projection plane.

Thereby, in a case where the input member I is rotated in the normal rotation direction (in a direction indicated with a bold arrow in each of FIGS. 2 to 5) by the rotational force transmitted from the engine to the input tooth portion Ig of the differential device D in order to make the automobile travel forward, the lubricant oil scattered around the differential case DC inside the transmission case 1 flows from the peripheral edges of the lightening portions 8 into the oil retaining portions 7 (that is, into the oil guide grooves 17) due to relative speed difference between the scattered lubricant oil and the cover portions C, C' in rotation. In this case, the lubricant oil having flown into the oil guide grooves 17 is efficiently collected to the inner back groove portions 17i located at the backmost positions in the oil guide grooves 17 in the rotational direction, particularly by an oil guiding effect of the first inner walls 17a, and is thereafter efficiently guided from the inner back groove portions 17i toward the washers W and the through oil passages 15. Subsequently, the lubricant oil having reached the inner sides of the side gears S after passing through the through oil passages 15 flows outward in the radial direction along the inner side surfaces of the intermediate wall portions Sw of the side gears S due to the centrifugal force, and eventually reaches the tooth portions Sg of the side gears S. Thereby, an effect of lubricating the washers W is enhanced. In addition, the amount of lubricant oil flowing through the through oil passages 15 toward the tooth portions Sg in the outer peripheries of the side gears S can be more effectively increased, and an effect of lubricating meshing portions of the side gears S and the pinions P and sliding portions of the pinions P is enhanced.

Furthermore, the cover portions C, C' of the embodiment have oil guiding inclined surfaces f in peripheral edge portions of the lightening portions 8, the oil guiding inclined surfaces f being capable of guiding flow of the lubricant oil into an inner side of the input member I during the rotation of the input member I. Inlets of the oil guide grooves 17 mentioned above are opened to the oil guiding inclined surfaces f. In addition, as seen in a cross-section crossing the oil retaining portions 7 and the connecting arm portions 9 in the peripheral direction of the input member I (see the partial sectional view in FIG. 2), the oil guiding inclined surface f is formed so as to be inclined to the respective center sides in the peripheral direction of the oil retaining portion 7 and the connecting arm portion 9, toward their respective inner side surfaces from their respective outer side surfaces.

Thus, due to the oil guiding effect of the oil guiding inclined surfaces f, the lubricant oil can smoothly flow from the outer sides to the inner sides of the cover portions C, C' with the rotation of the differential case DC and particularly the lubricant oil can more efficiently flow into the oil guide grooves 17 from the inlets of the oil guide grooves 17 which are opened to the oil guiding inclined surfaces f. Therefore, in combination with the above-described oil guiding effect of the oil guide grooves 17, it is possible to further enhance the effect of lubricating the meshing portions and the like.

Incidentally, various modified embodiments can be devised for the form of the lightening portions 8 (accordingly, the oil retaining portions 7 and the connecting arm portions 9) of the cover portions C, C', and the form of the lightening portions 8 is not limited to the embodiment shown in FIGS. 2 and 3.

It should be additionally noted that various modified embodiments can be also made to the form of the oil guide grooves 17 recessed in the inner side surfaces of the side wall portions Cs of the cover portions C, C', and for example, as shown in FIG. 7, the oil guide grooves 17 may be each formed in a shape of a series of arcs, part of the arcs having a different curvature. That is, with respect to the oil guide grooves 17, when the lubricant oil scattered in the transmission case 1 in accordance with the rotation of the input member I in the normal rotation direction flows from the peripheral edges of the lightening portions 8 of the cover portions C, C' into the oil guide grooves 17, the lubricant oil flowing into the oil guide grooves 17 is efficiently collected to the inner back groove portions 17i located at the backmost positions in the oil guide grooves 17 in the rotational direction, by the oil guiding effect of the first inner walls 17a each having an arc shape, and is thereafter efficiently guided from the inner back groove portions 17i toward the washers W and the through oil passages 15, like in the foregoing embodiment illustrated in FIGS. 1 to 6B. Accordingly, the oil guide grooves 17 illustrated in FIG. 7 can achieve the same effect as the oil guide grooves 17 illustrated in FIGS. 1 to 6B.

Next, descriptions will be provided for an operation of the embodiment described above. In the differential device D of this embodiment, in a case where the input member I receives rotational force from the engine, when the pinion P revolves around the axis L of the input member I together with the input member I without rotating around the pinion shaft PS, the left and right side gears S are rotationally driven at the same speed, and their driving forces are evenly transmitted to the left and right output shafts A. Meanwhile, when a difference in rotational speed occurs between the left and right output shafts A due to turn traveling or the like of the automobile, the pinion P revolves around the axis L of the input member I while rotating around the pinion shaft PS. Thereby, the rotational driving force is transmitted from the pinion P to the left and right side gears S while allowing differential rotations. The above is the same as the operation of the conventional differential device.

In addition, in a case where the power of the engine is transmitted to the left and right output shafts A via the differential device D while the automobile is traveling forward, the lubricant oil is forcefully splashed in various places inside the transmission case 1 due to rotation of the differential case DC in the normal rotation direction (direction of a thick arrow in FIGS. 2 and 5). Part of the splashed lubricant oil flows into the inner sides of the cover portions C, C' through the lightening portions 8.

In this case, after flowing into the oil guide grooves 17 formed in the inner side surfaces of the side wall portions Cs of the cover portions C, C', the lubricant oil is efficiently collected to the inner back groove portions 17$i$ by the oil guiding effect of the first inner walls 17$a$ as described above, and is subsequently efficiently guided from the inner back groove portions 17$i$ toward the washers W and the through oil passages 15. For this reason, the effect of lubricating the washers W is enhanced. In addition, the amount of lubricant oil flowing through the through oil passages 15 toward the tooth portions Sg in the outer peripheries of the side gears S due to the centrifugal force can be more effectively increased. Thereby the effect of lubricating the meshing portions of the side gears S and the pinions P and the sliding portions of the pinions P is enhanced. As a result, even in a case where the tooth portions Sg of the side gears S are placed farther from the output shafts A due to an increase in the diameter of the side gears S, or even under severe driving conditions with high-speed rotation of the pinions P, the lubricant oil can be efficiently supplied to the meshing portions and the sliding portions. Accordingly, seizure in the meshing portions and the sliding portions can be prevented effectively.

Thus, in the differential device D of this embodiment, each side gear S includes: the shaft portion Sj connected to each of the output shafts A.; and the intermediate wall portion Sw formed in a flat ring plate shape orthogonal to the axis L of the output shafts A, and integrally connecting the shaft portion Sj and the tooth portion Sg of the side gear S which is separated outward from the shaft portion Sj in the radial direction of the input member I. Furthermore, the intermediate wall portion Sw is formed in the way that a width t1 of the intermediate wall portion Sw in the radial direction is longer than a maximum diameter d1 of each pinion P. For these reasons, relative to the pinions P, the diameter of the side gear S can be made large enough to set the number Z1 of teeth of the side gear S sufficiently larger than the number Z2 of teeth of the pinions P. This makes it possible to reduce load burden to the pinion shaft PS while the torque is being transmitted from the pinions P to the side gears S, thus to decrease the effective diameter d2 of the pinion shaft PS, and accordingly to decrease the width of the pinions P in the axial direction of the output shafts A.

In addition, since the load burden to the pinion shaft PS is reduced as describe above, since reaction force applied to each side gear S decreases, and since the back surface of the intermediate wall portion Sw or the tooth portion Sg of the side gear S is supported by the corresponding cover side wall portion Cs, it is easy to secure the rigidity strength needed for the side gear S even though the intermediate wall portion Sw of the side gear S is thinned. That is to say, it is possible to sufficiently thin the intermediate wall portion Sw of the side gear S while securing the support rigidity with respect to the side gear S. Moreover, in the embodiment, since the maximum thickness t2 of the side gear intermediate wall portion Sw is formed much smaller than the effective diameter d2 of the pinion shaft PS whose diameter can be made smaller as described above, the further thinning of the side gear intermediate wall portion Sw can be achieved. Besides, since the cover side wall portion Cs is formed in a plate shape such that the outer side surface thereof is the flat surface orthogonal to the axis L of the output shafts A, the thinning of the cover side wall portion Cs itself can be achieved.

As a result of these, the width of the differential device D as a whole can be sufficiently decreased in the axial direction of the output shafts A while securing approximately the same strength (for example, static torsion load strength) and approximately the same amount of maximum torque transmission compared with the conventional differential device. This makes it possible to easily incorporate the differential device D, with great freedom and without trouble, even when a transmission system imposes many restrictions on the layout of the vicinity of the differential device D, and is extremely advantageous in reducing the size of the transmission system.

Figure 8:
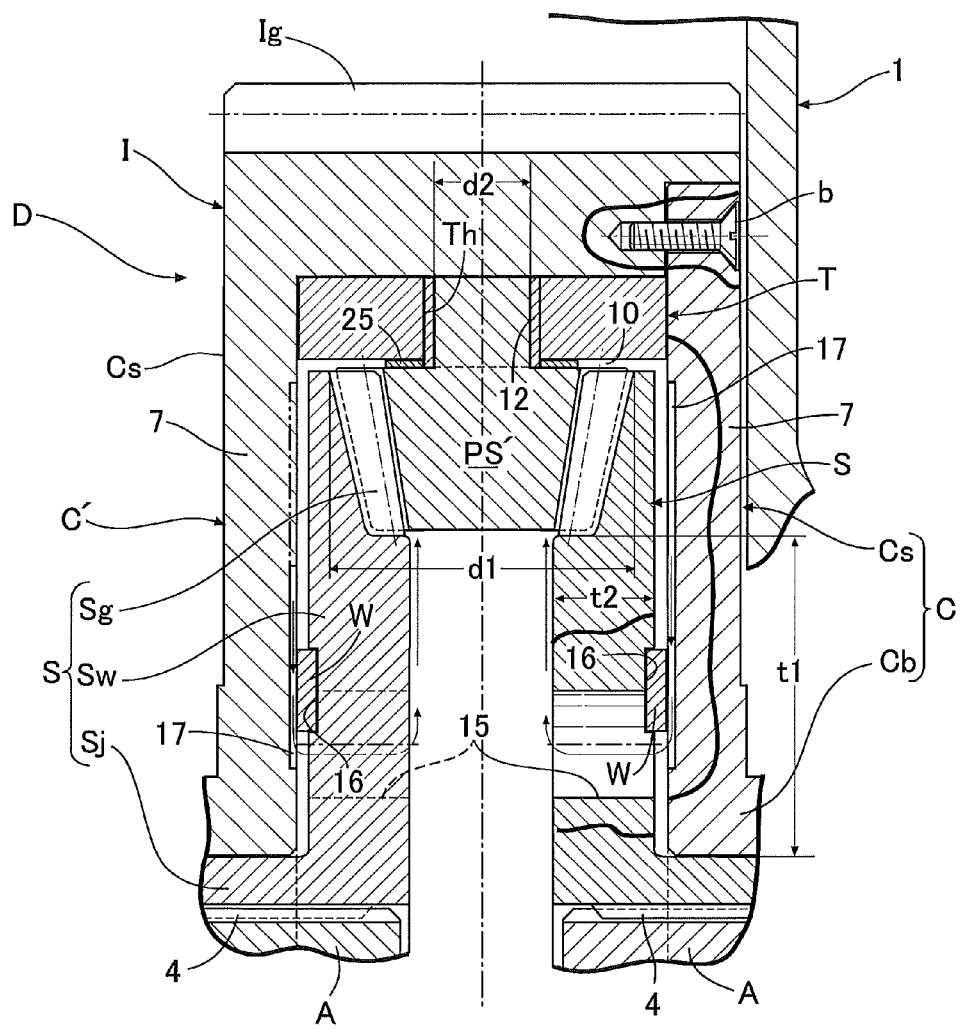
FIG. 8 is a partial sectional view corresponding to FIG. 6A and showing a modified embodiment of a pinion support portion of a differential device according to a second embodiment of the present invention.

Meanwhile, the first embodiment described above shows that the long pinion shaft PS is used as the pinion support portion (the differential gear support portion). However, as in a second embodiment of the present invention illustrated in FIG. 8, the pinion support portion (the differential support portion) may be formed from a support shaft portion PS' coaxially and integrally connected to a large diameter-side end surface of the pinion (the differential gear) P. According to this configuration, because the through-hole into which the pinion shaft PS is fitted need not be provided to the pinion P, the diameter of the pinion P can be accordingly decreased (the width thereof can be decreased in the axial direction), and the differential device D can be flattened in the axial direction of the output shafts A. In other words, when the pinion shaft PS is penetrated through the pinion P, it is necessary to form in the pinion P the through-hole with a size corresponding to the pinion shaft diameter. However, when the support shaft portion PS' is integrated with the end surface of the pinion P, it is possible to decrease the diameter of the pinion P (to decrease the width thereof in the axial direction) without depending on a diameter of the support shaft portion PS'.

Moreover, in this second embodiment, a bearing bush 12 as a bearing allowing relative rotations between the support shaft portion PS' and the attachment body T is inserted between an outer peripheral surface of the support shaft portion PS' and an inner peripheral surface of the retaining hole Th of the corresponding attachment body T into which the support shaft portion PS' is inserted. Incidentally, the bearing may be formed from a needle bearing or the like. In addition, the bearing may be omitted so that the support shaft portion PS' is directly fitted into the retaining hole Th of the attachment body T.

Meanwhile, in the conventional differential devices exemplified in Japanese Patent No. 4803871 and Japanese Patent Application KOKAI Publication No. 2002-364728 which are described above (particularly, the conventional differential devices each including inside the input member the pinion (the differential gear) and the pair of side gears (output gears) in mesh with the pinion (the differential gear)), the number Z1 of teeth of the side gear (output gear) and the number Z2 of teeth of the pinion (differential gear) are generally set at 14 and 10, 16 and 10, or 13 and 9, respectively, as shown in Japanese Patent Application KOKAI Publication No. 2002-364728, for example. In these cases, the number-of-teeth ratios Z1/Z2 of the output gears to the differential gears are 1.4, 1.6 and 1.44, respectively. In addition, other publicly-known examples of the combination of the number Z1 of teeth and the number Z2 of teeth for conventional differential devices include 15 and 10, 17 and 10, 18 and 10, 19 and 10, and 20 and 10. In these cases, the number-of-teeth ratios Z1/Z2 are at 1.5, 1.7, 1.8, 1.9 and 2.0, respectively.

On the other hand, nowadays, there is an increase in the number of transmission systems which are under layout restrictions around their respective differential devices. Accordingly, the market demands that differential devices be sufficiently reduced in width (i.e., thinned) in the axial direction of their output shafts while securing the gear strength for the differential devices. However, the structural forms of the conventional existing differential devices are wide in the axial direction of the output shafts, as apparent from the gear combinations leading to the above-mentioned number-of-teeth ratios. This makes it difficult to satisfy the market demand.

With this taken into consideration, an attempt to find a concrete configuration example of the differential device D which can be sufficiently reduced in width (i.e., thinned) in the axial direction of the output shafts while securing the gear strength for the differential device has been made as follows, from a viewpoint different from that of the foregoing embodiment. Incidentally, the structures of the components of the differential device D of this configuration example are the same as the structures of the components of the differential device D of the foregoing embodiments which has been described using FIGS. 1 to 8 (especially, FIGS. 1 to 7). For this reason, the components of the configuration example will be denoted with the same reference signs as those of the embodiments, and descriptions for the structures will be omitted.

Figure 9:
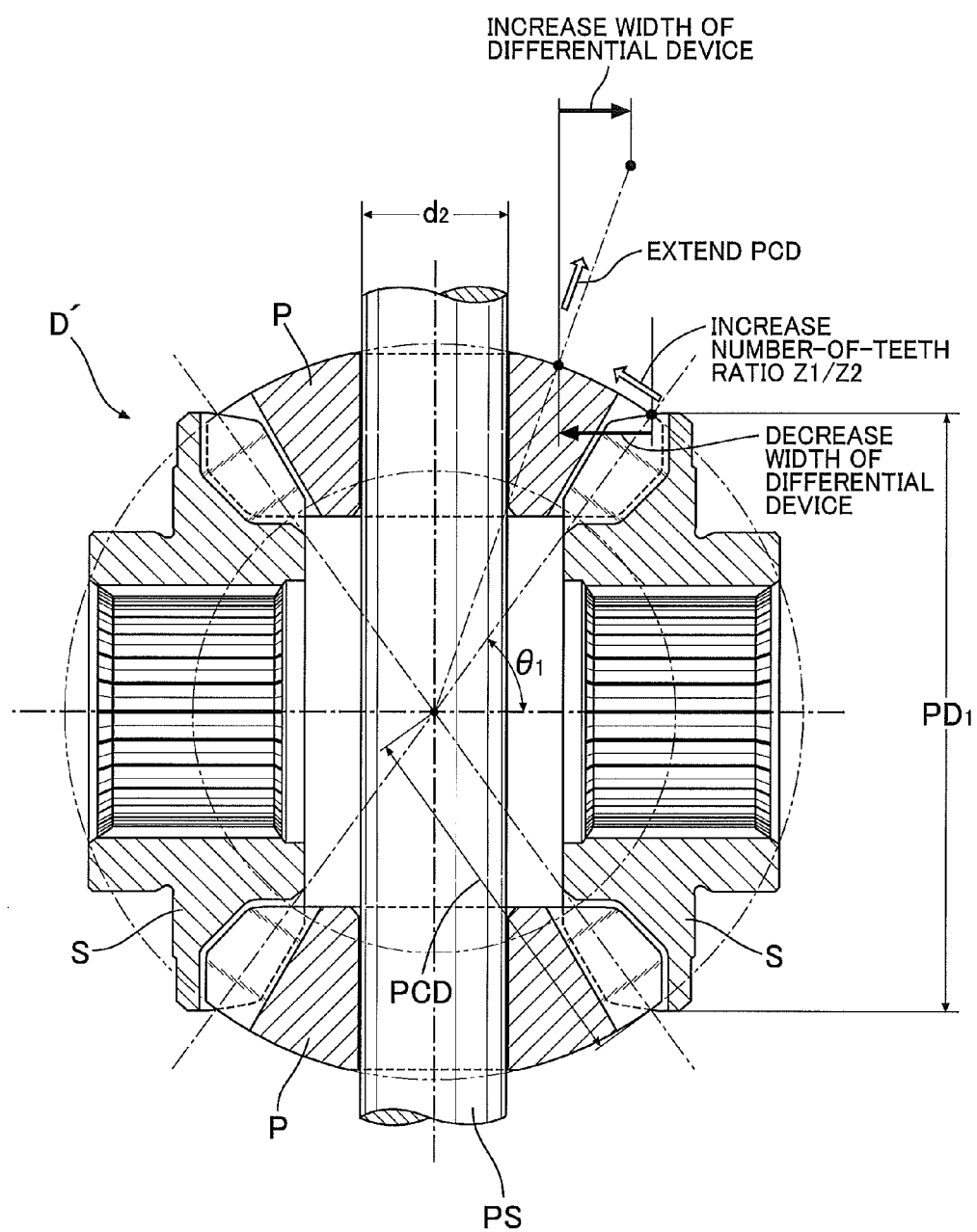
FIG. 9 is a longitudinal sectional view showing an example of a conventional differential device.

To begin with, let us explain a basic concept for sufficiently reducing the width of (i.e., thinning) the differential device D in the axial direction of the output shafts A referring to FIG. 9 together. The concept is as follows.

Approach [1] To make the number-of-teeth ratio Z1/Z2 of the side gear S, that is, the output gear to the pinion P, that is, the differential gear larger than the number-of-teeth ratio used for the conventional existing differential device. (This leads to a decrease in the module (accordingly the tooth thickness) of the gear and a resultant decrease in the gear strength, while leading to an increase in the pitch circle diameter of the side gear S, a resultant decrease in transmission load in the meshing portion of the gear, and a resultant increase in the gear strength. However, the gear strength as a whole decreases, as discussed below.)

Approach [2] To make the pitch cone distance PCD of the pinion P larger than the pitch cone distance in the conventional existing differential device. (This leads to an increase in the module of the gear and a resultant increase in the gear strength, while leading to an increase in the pitch circle diameter of the side gear S, a resultant decrease in the transmission load in the meshing portion of the gear, and a resultant increase in the gear strength. Thus, the gear strength as a whole increases greatly, as discussed below.)

For these reasons, when the number-of-teeth ratio Z1/Z2 and the pitch cone distance PCD are set such that the amount of decrease in the gear strength based on Approach [1] is equal to the amount of increase in the gear strength based on Approach [2] or such that the amount of increase in the gear strength based on Approach [2] is greater than the amount of decrease in the gear strength based on Approach [1], the gear strength as a whole can be made equal to or greater than that of the conventional existing differential device.

Next, let us concretely examine how the gear strength changes based on Approaches [1] and [2] using mathematical expressions. Incidentally, the examination will be described in the following embodiment. First of all, a "reference differential device" is defined as a differential device D' in which the number Z1 of teeth of the side gear S is set at 14 while the number Z2 of teeth of the pinion P is set at 10. In addition, for each variable, a "change rate" is defined as a rate of change in the variable in comparison with the corresponding base number (i.e., 100%) of the reference differential device D'.

Approach [1]

When M, $PD_1$, $\theta_1$, PCD, F, and T respectively denote the module, pitch circle diameter, pitch angle, pitch cone distance, transmission load in the gear meshing portion, and transmission torque in the gear meshing portion, of the side gear S, general formulae concerning the bevel gear provide $$M=PD_1/Z1,$$

$$PD_1=2PCD\cdot\sin\theta_1, \text{ and}$$

$$\theta_1=\tan^{-1}(Z1/Z2).$$

From these expressions, the module of the gear is expressed with $$M=2PCD\cdot\sin\{\tan^{-1}(Z1/Z2)\}/Z1. \quad (1)$$

Meanwhile, the module of the reference differential device D' is expressed with $$2PCD\cdot\sin\{\tan^{-1}(7/5)\}/14.$$

Dividing the term on the right side of Expression (1) by $2PCD\cdot\sin\{\tan^{-1}(7/5)\}/14$ yields a module change rate with respect to the reference differential device D', which is expressed with Expression (2) given below.

$$\text{Module Change Rate} = \frac{14\cdot\sin\left(\tan^{-1}\frac{z1}{z2}\right)}{z1\cdot\sin\left(\tan^{-1}\frac{7}{5}\right)} \quad (2)$$

In addition, the section modulus of the tooth portion corresponding to the gear strength (i.e., the bending strength) of the tooth portion is in proportion to the square of the tooth thickness, while the tooth thickness has a substantially linear relationship with the module M. For these reasons, the square of the module change rate corresponds to a rate of change in the section modulus of the tooth portion, accordingly a gear strength change rate. In other words, based on Expression (2) given above, the gear strength change rate is expressed with Expression (3) given below. Expression (3) is represented by a line L1 in FIG. 10 when the number Z2 of teeth of the pinion P is 10. From the line L1, it is learned that as the number-of-teeth ratio Z1/Z2 becomes larger, the module becomes smaller and the gear strength accordingly becomes lower.

Gear Strength Change Rate = (Module Change Rate)² (3)

$$= \frac{196 \cdot \sin^2\left(\tan^{-1}\frac{z1}{z2}\right)}{z1^2 \cdot \sin^2\left(\tan^{-1}\frac{7}{5}\right)}$$

Meanwhile, based on the general formulae concerning the bevel gear, a torque transmission distance of the side gear S is expressed with Expression (4) given below.

$$PD_1/2 = PCD \cdot \sin\{\tan^{-1}(Z1/Z2)\} \quad (4)$$

From the torque transmission distance $PD_1/2$, the transmission load F is given as $$F = 2T/PD_1.$$

For this reason, when the torque T of the side gear S of the reference differential device D' is constant, the transmission load F is in inverse proportion to the pitch circle diameter $PD_1$. In addition, the rate of change in the transmission load F is in inverse proportion to the gear strength change rate. For this reason, the gear strength change rate is equal to the rate of change in the pitch circle diameter $PD_1$.

As a result, using Expression (4), the rate of change in the pitch circle diameter $PD_1$ is expressed with Expression (5) given below.

Gear Strength Change Rate = $PD_1$ Change Rate (5)

$$= \frac{\sin\left(\tan^{-1}\frac{z1}{z2}\right)}{\sin\left(\tan^{-1}\frac{7}{5}\right)}$$

Figure 10:
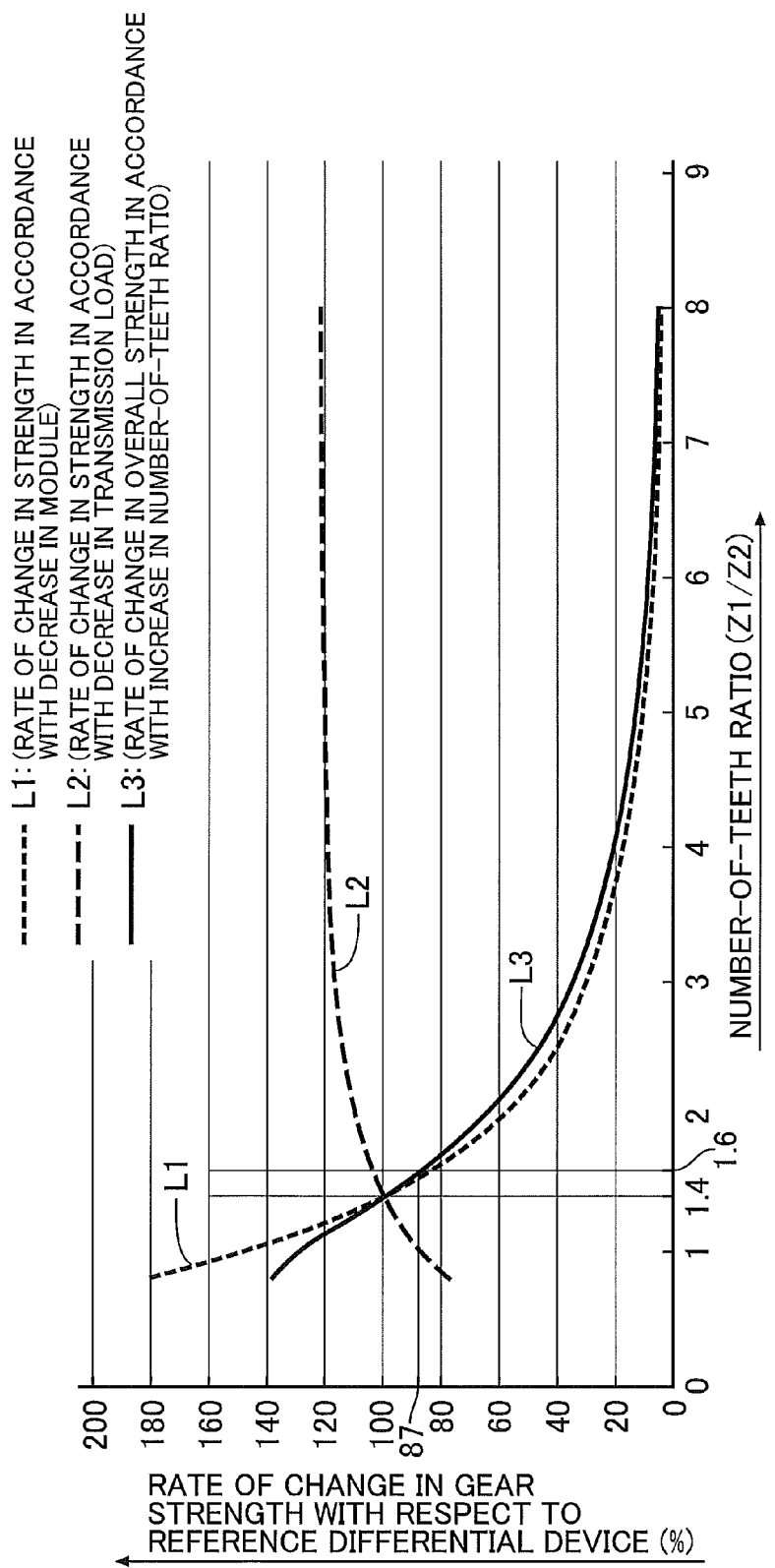
FIG. 10 is a graph showing a relationship of gear strength change rates with a number-of-teeth ratio where the number of teeth of the pinion is set at 10.

Expression (5) is represented by a line L2 in FIG. 10 when the number Z2 of teeth of the pinion P is 10. From the line L2, it is learned that as the number-of-teeth ratio Z1/Z2 becomes larger, the transmission load becomes smaller, and the gear strength accordingly becomes stronger.

Eventually, the gear strength change rate in accordance with the increase in the number-of-teeth ratio Z1/Z2 is expressed with Expression (6) given below by multiplying a rate of decrease change in the gear strength in accordance with the decrease in the module M (the term on the right side of Expression (3) shown above) and a rate of increase change in the gear strength in accordance with the decrease in the transmission load (the term on the right side of Expression (5) shown above).

Gear Strength Change Rate in Accordance (6)
with Number-of-Teeth Ratio = $\dfrac{196 \cdot \sin^3\left(\tan^{-1}\frac{z1}{z2}\right)}{z1^2 \cdot \sin^3\left(\tan^{-1}\frac{7}{5}\right)}$ Expression (6) is represented by a line L3 in FIG. 10 when the number Z2 of teeth of the pinion P is 10. From the line L3, it is learned that as the number-of-teeth ratio Z1/Z2 becomes larger, the gear strength as a whole becomes lower. Approach [2]

In a case of increasing the pitch cone distance PCD of the pinion P more than the pitch cone distance in the reference differential device D', when PCD1, PCD2 respectively denote the pitch cone distance PCD before the change and the pitch cone distance PCD after the change, the module change rate in accordance with the change in the pitch cone distance PCD is expressed with

PCD2/PCD1 if the number of teeth is constant, based on the above-mentioned general formulae concerning the bevel gear.

Meanwhile, as being clear from the above-discussed process for deriving Expression (3), the gear strength change rate of the side gear S corresponds to the square of the module change rate. For this reason, Gear Strength Change Rage in Accordance with
Increase in Module = (PCD2/PCD1)² (7)

is obtained. Expression (7) is represented by a line L4 in FIG. 11. From the line L4, it is learned that as the pitch cone distance PCD becomes larger, the module becomes larger, and the gear strength accordingly becomes stronger.

In addition, when the pitch cone distance PCD is made larger than the pitch cone distance PCD1 in the reference differential device D', the transmission load F decreases. Thereby, the gear strength change rate becomes equal to the rate of change in the pitch circle diameter $PD_1$, as described above. In addition, the pitch circle diameter $PD_1$ of the side gear S is in proportion to the pitch cone distance PCD. For these reasons, Gear Strength Change Rate in Accordance with
Decrease in Transmission Load = PCD2/PCD1 (8)

is obtained.

Figure 11:
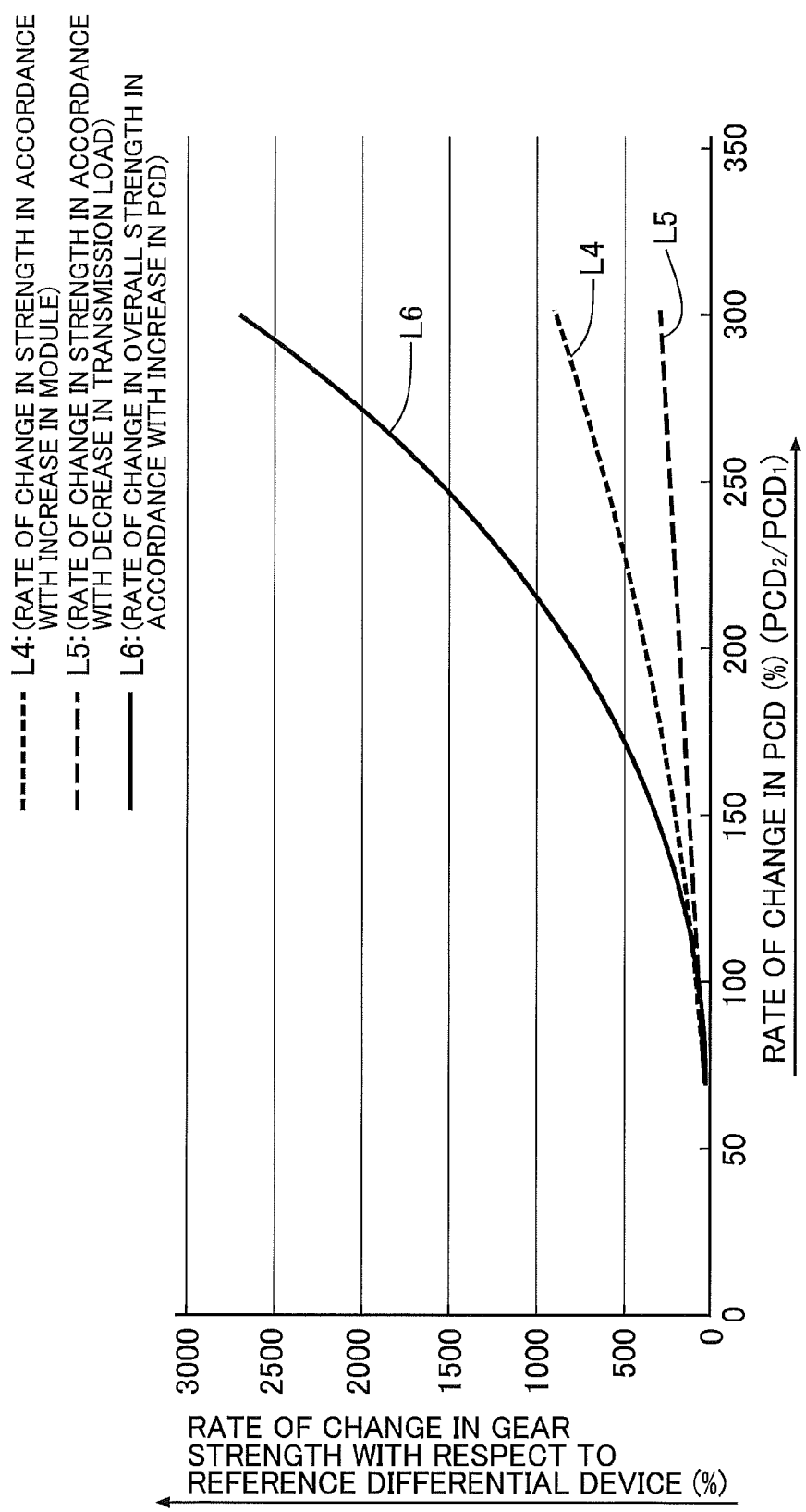
FIG. 11 is a graph showing a relationship of the gear strength change rates with a pitch cone distance change rate.

Expression (8) is represented by a line L5 in FIG. 11. From the line L5, it is learned that as the pitch cone distance PCD becomes larger, the transmission load becomes lower, and the gear strength accordingly becomes stronger.

In addition, the gear strength change rate in accordance with the increase in the pitch cone distance PCD is expressed with Expression (9) given below by multiplying the rate of increase change in the gear strength in accordance with the increase in the module M (the term on the right side of Expression (7) shown above) and the rate of increase change in the gear strength in accordance with the decrease in the transmission load in response to the increase in the pitch circle diameter PD (the term on the right side of Expression (8) shown above).

Gear Strength Change Rate in Accordance with
Increase in Pitch Cone Distance = (PCD2/PCD1)³ (9)

Expression (9) is represented by a line L6 in FIG. 11. From the line L6, it is learned that as the pitch cone distance PCD becomes larger, the gear strength is increased greatly.

With these taken into consideration, the combination of the number-of-teeth ratio Z1/Z2 and the pitch cone distance PCD is determined such that: the decrease in the gear strength based on Approach [1] given above (the increase in the number-of-teeth ratio) is sufficiently compensated for by the increase in the gear strength based on Approach [2] given above (the increase in the pitch cone distance) so as to make the overall gear strength of the differential device equal to or greater than the gear strength of the conventional existing differential device.

For example, 100% of the gear strength of the side gear S of the reference differential device D' can be kept by setting the gear strength change rate in accordance with the increase in the number-of-teeth ratio (i.e., the term on the right side of Expression (6) given above) obtained based on Approach [1] given above and the gear strength change rate in accordance with the increase in the pitch cone distance (i.e., the term on the right side of Expression (9) given above) obtained based on Approach [2] given above, such that the multiplication of these gear strength change rates becomes equal to 100%. Thereby, the relationship between the number-of-teeth ratio Z1/Z2 and the rate of change in the pitch cone distance PCD for keeping 100% of the gear strength of the reference differential device D' can be obtained from Expression (10) given below. Expression (10) is represented by a line L7 in FIG. 12 when the number Z2 of teeth of the pinion P is 10.

$$PCD2/PCD1 = \left( \frac{100\% / \text{Gear Strength Change Rate}}{\text{in Accordance with Number-of-Teeth Ratio}} \right)^{\frac{1}{3}} \quad (10)$$

$$= \left\{ \frac{1}{\frac{196 \cdot \sin^3\left(\tan^{-1}\frac{z1}{z2}\right)}{z1^2 \cdot \sin^3\left(\tan^{-1}\frac{7}{5}\right)}} \right\}^{\frac{1}{3}}$$

$$= \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)}$$

Figure 12:
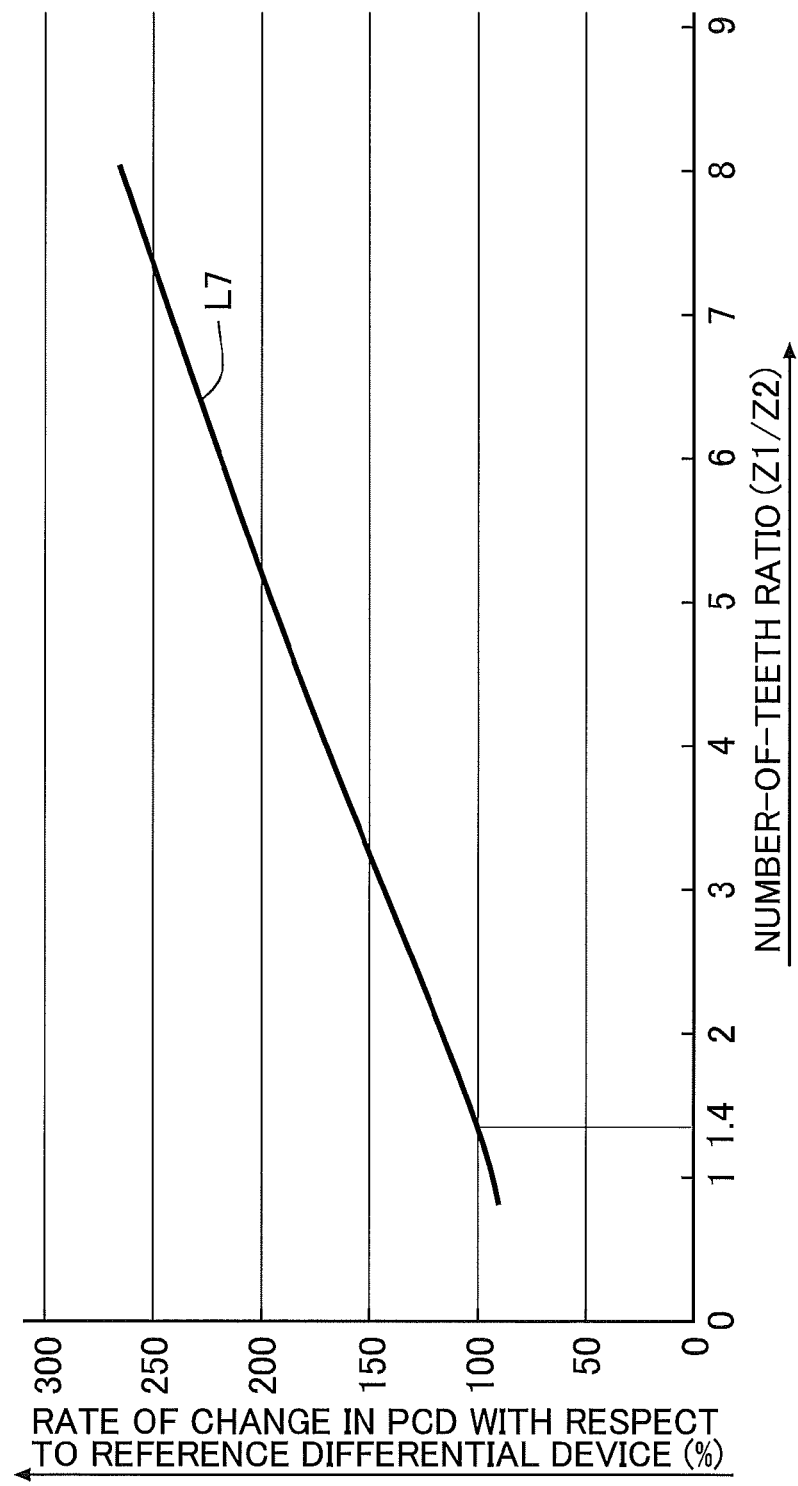
FIG. 12 is a graph showing a relationship of the pitch cone distance change rate with the number-of-teeth ratio for keeping 100% of the gear strength where the number of teeth of the pinion is set at 10.

Like this, Expression (10) represents the relationship between the number-of-teeth ratio Z1/Z2 and the rate of change in the pitch cone distance PCD for keeping 100% of the gear strength of the reference differential device D' when the number-of-teeth ratio Z1/Z2 is equal to 14/10 (see FIG. 12). The rate of change in the pitch cone distance PCD represented by the vertical axis in FIG. 12 can be converted into a ratio of d2/PCD where d2 denotes a shaft diameter of the pinion shaft PS (i.e., the pinion support portion) supporting the pinion P.

TABLE 1

| PCD | SHAFT DIAMETER (d2) | d2/PCD |
|---|---|---|
| 31 | 13 | 42% |
| 35 | 15 | 43% |
| 38 | 17 | 45% |
| 39 | 17 | 44% |
| 41 | 18 | 44% |
| 45 | 18 | 40% |

To put it concretely, in the conventional existing differential device, the increase change in the pitch cone distance PCD correlates with the increase change in the shaft diameter d2 as shown in Table 1, and can be represented by a decrease in the ratio of d2/PCD when d2 is constant. In addition, in the conventional existing differential device, d2/PCD falls within a range of 40% to 45% as shown in Table 1 given above when the conventional existing differential device is the reference differential device D', and the gear strength increases as the pitch cone distance PCD increases. Judging from these, the gear strength of the differential device can be made equal to or greater than the gear strength of the conventional existing differential device by determining the shaft diameter d2 of the pinion shaft PS and the pitch cone distance PCD such that at least d2/PCD is equal to or less than 45%, when the differential device is the reference differential device D'. In other words, when the differential device is the reference differential device D', it suffices if d2/PCD≤0.45 is satisfied. In this case, when PCD2 denotes the pitch cone distance PCD which is changed to become larger or less than the pitch cone distance PCD1 of the reference differential device D', it suffices if $$d2/PCD2 \leq 0.45/(PCD2/PCD1) \quad (11)$$

is satisfied. Furthermore, the application of Expression (11) to Expression (10) given above can convert the relationship between d2/PCD and the number-of-teeth ratio Z1/Z2 into Expression (12) given below.

$$d2/PCD \leq 0.45/(PCD2/PCD1) \quad (12)$$

$$= 0.45 / \left\{ \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)} \right\}$$

$$= 0.45 \cdot \left(\frac{14}{z1}\right)^{\frac{2}{3}} \cdot \frac{\sin\left(\tan^{-1}\frac{z1}{z2}\right)}{\sin\left(\tan^{-1}\frac{7}{5}\right)}$$

Figure 13:
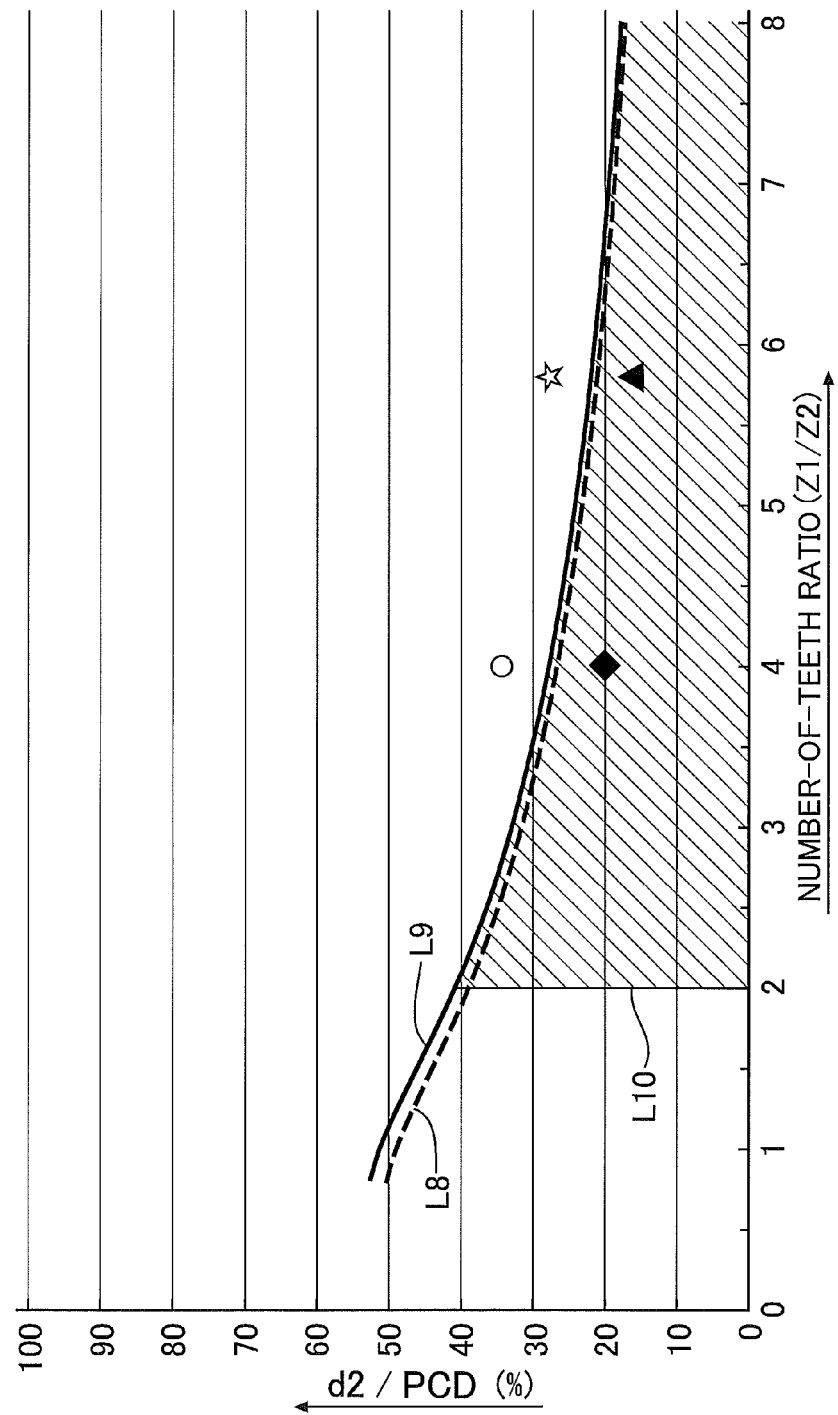
FIG. 13 is a graph showing a relationship between a shaft diameter/pitch cone distance ratio and the number-of-teeth ratio where the number of teeth of the pinion is set at 10.

When the Expression (12) is equal, Expression (12) can be represented by a line L8 in FIG. 13 if the number Z2 of teeth of the pinion P is 10. When the Expression (12) is equal, the relationship between d2/PCD and the number-of-teeth ratio Z1/Z2 keeps 100% of the gear strength of the reference differential device D'.

Meanwhile, in conventional existing differential devices, usually, not only the number-of-teeth ratio Z1/Z2 equal to 1.4 used above to explain the reference differential device D' but also the number-of-teeth ratio Z1/Z2 equal to 1.6 or 1.44 is adopted. This needs to be taken into consideration. Based on the assumption that the reference differential device D' (Z1/Z2=1.4) guarantee the necessary and sufficient gear strength, that is, 100% of gear strength, it is learned, as being clear from FIG. 10, that the gear strength of conventional existing differential devices in which the number-of-teeth ratio Z1/Z2 is 16/10 is as low as 87% of the gear strength of the reference differential device D'. The general practice, however, is that the gear strength low at that level is accepted as practical strength and actually used for conventional existing differential devices. Judging from this, one may consider that gear strength which needs to be sufficiently secured for and is acceptable for the differential device which is thinned in the axial direction is at least equal to, or greater than, 87% of the gear strength of the reference differential device D'.

From the above viewpoint, first, a relationship for keeping 87% of the gear strength of the reference differential device D' is obtained between the number-of-teeth ratio Z1/Z2 and the rate of change in the pitch cone distance PCD. The relationship can be expressed with Expression (10') given below by performing a calculation by emulating the process of deriving Expression (10) given above (i.e., a calculation such that the multiplication of the gear strength change rate in accordance with the increase in the number-of-teeth ratio (i.e., the term on the right side of Expression (6) given above) and the gear strength change rate in accordance with the increase in the pitch cone distance (i.e., the term on the right side of Expression (9) given above) becomes equal to 87%).

$$PCD2/PCD1 = \left( \frac{87\% / \text{Gear Strength Change Rate}}{\text{in Accordance with Number-of-Teeth Ratio}} \right)^{\frac{1}{3}} \quad (10')$$

$$= \left\{ \frac{0.87}{\dfrac{196 \cdot \sin^3\left(\tan^{-1}\dfrac{z1}{z2}\right)}{z1^2 \cdot \sin^3\left(\tan^{-1}\dfrac{7}{5}\right)}} \right\}^{\frac{1}{3}}$$

$$= 0.87^{\frac{1}{3}} \cdot \left(\frac{z1}{14}\right)^{\frac{2}{3}} \cdot \frac{\sin\left(\tan^{-1}\dfrac{7}{5}\right)}{\sin\left(\tan^{-1}\dfrac{z1}{z2}\right)}$$

Thereafter, when Expression (11) given above is applied to Expression (10') given above, the relationship between d2/PCD and the number-of-teeth ratio Z1/Z2 for keeping 87% or more of the gear strength of the reference differential device D' can be converted into Expression (13) given below. However, the calculation is performed using the following rules that: the number of significant figures is three for all the factors, except for factors expressed with variables; digits below the third significant figure are rounded down; and although the result of the calculation cannot avoid approximation by an calculation error, the mathematical expression uses the equals sign because the error is negligible.

$$d2/PCD \le 0.45/\left\{ 0.87^{\frac{1}{3}} \cdot \left(\frac{z1}{14}\right)^{\frac{2}{3}} \cdot \frac{\sin\left(\tan^{-1}\dfrac{7}{5}\right)}{\sin\left(\tan^{-1}\dfrac{z1}{z2}\right)} \right\} \quad (13)$$

$$= 3.36 \cdot \left(\frac{1}{z1}\right)^{\frac{2}{3}} \cdot \sin\left(\tan^{-1}\frac{z1}{z2}\right)$$

When the Expression (13) is equal, Expression (13) can be represented by FIG. 13 (more specifically, by a line L9 in FIG. 13) if the number Z2 of teeth of the pinion P is 10. In this case, an area corresponding to Expression (13) is an area on and under the line L9 in FIG. 13. In addition, a specific area (a hatched area in FIG. 13) satisfying Expression (13) and located on the right side of a line L10 in FIG. 13 where the number-of-teeth ratio Z1/Z2>2.0 is satisfied is an area for setting Z1/Z2 and d2/PCD which enable at least 87% or more of the gear strength of the reference differential device D' to be secured particularly for the differential device thinned in the axial direction where the number Z2 of teeth of the pinion P is 10 and the number-of-teeth ratio Z1/Z2 is greater than 2.0. For reference, a black diamond in FIG. 13 represents an example where the number-of-teeth ratio Z1/Z2 and d2/PCD are set at 40/10 and 20.00%, respectively, and a black triangle in FIG. 13 represents an example where the number-of-teeth ratio Z1/Z2 and d2/PCD are set at 58/10 and 16.67%, respectively. These examples fall within the specific area. A result of a simulation for strength analysis on these examples has confirmed that the gear strength equal to or greater than those of the conventional differential devices (more specifically, the gear strength equal to or greater than 87% of the gear strength of the reference differential device D') were obtained.

Thus, the thinned differential device falling within the specific area is configured as the differential device which, as a whole, is sufficiently reduced in width in the axial direction of the output shafts while securing the gear strength (for example, static torsion load strength) and the maximum amount of torque transmission at approximately the same levels as the conventional existing differential devices which are not thinned in the axial direction thereof. Accordingly, it is possible to achieve effects of: being capable of easily incorporating the differential device in a transmission system, which is under many layout restrictions around the differential device, with great freedom and no specific difficulties; being extremely advantageous in reducing the size of the transmission system; and the like.

Moreover, when the thinned differential device in the specific area has, for example, the structure of the above-mentioned embodiment (more specifically, the structures shown in FIGS. 1 to 8), the thinned differential device in the specific area can obtain an effect derived from the structure shown in the embodiment.

Figure 14:
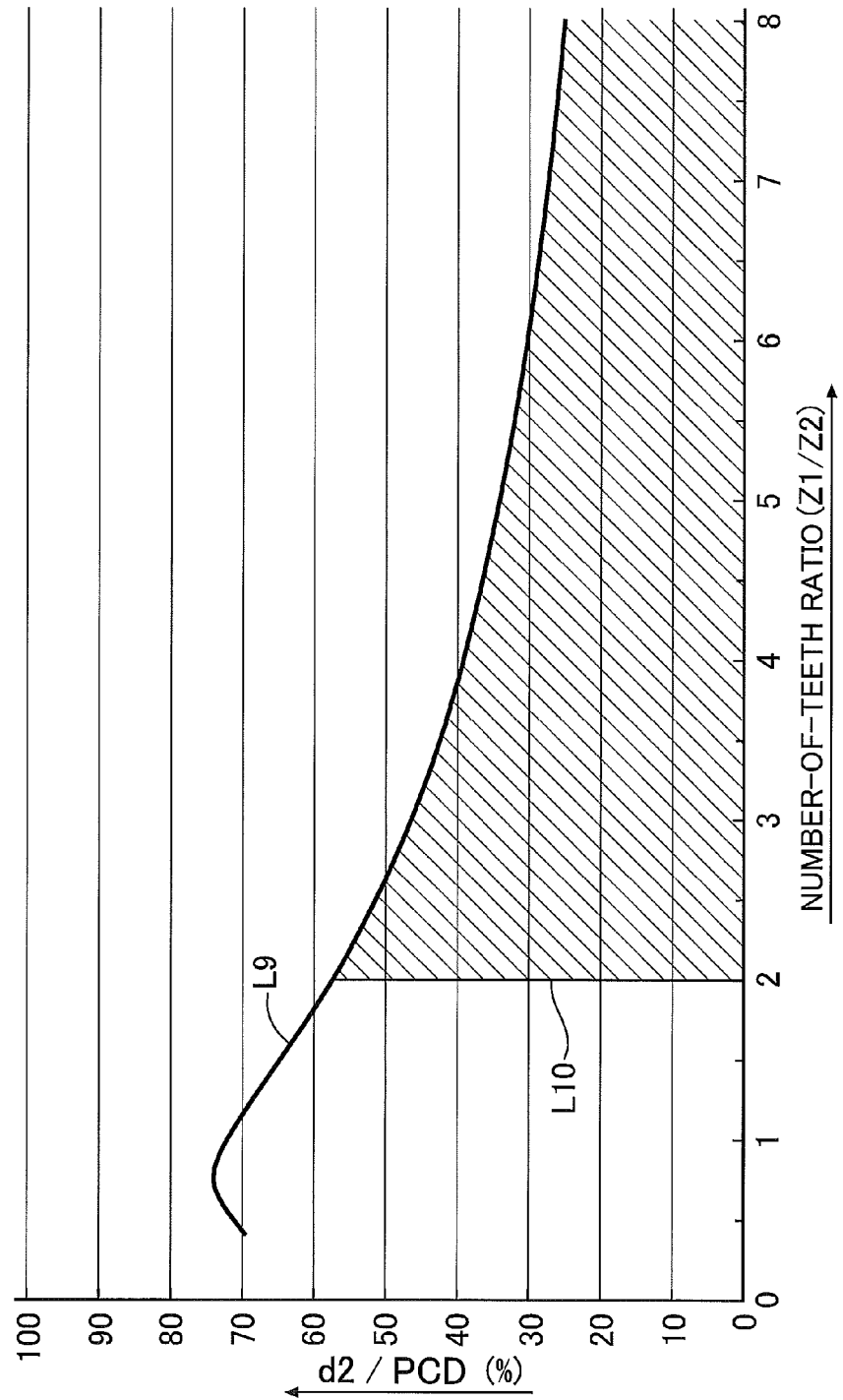
FIG. 14 is a graph showing a relationship between the shaft diameter/pitch cone distance ratio and the number-of-teeth ratio where the number of teeth of the pinion is set at 6.

It should be noted that although the foregoing descriptions (the descriptions in connection with FIGS. 10, 12, 13 in particular) have been provided for the differential device in which the number Z2 of teeth of the pinion P is set at 10, the present invention is not limited to this. For example, when the number Z2 of teeth of the pinion P is set at 6, 12 and 20, too, the thinned differential device capable of achieving the above effects can be represented by Expression (13), as shown by hatched areas in FIGS. 14, 15 and 16. In other words, Expression (13) derived in the above-described manner is applicable regardless of the change in the number Z2 of teeth of the pinion P. For example, even when the number Z2 of teeth of the pinion P is set at 6, 12and 20, the above effects can be obtained by setting the number Z1 of teeth of the side gear S, the number Z2 of teeth of the pinion P, the shaft diameter d2 of the pinion shaft PS and the pitch cone distance PCD such that Expression (13) is satisfied, like in the case where the number Z2 of teeth of the pinion P is set at 10.

Figure 15:
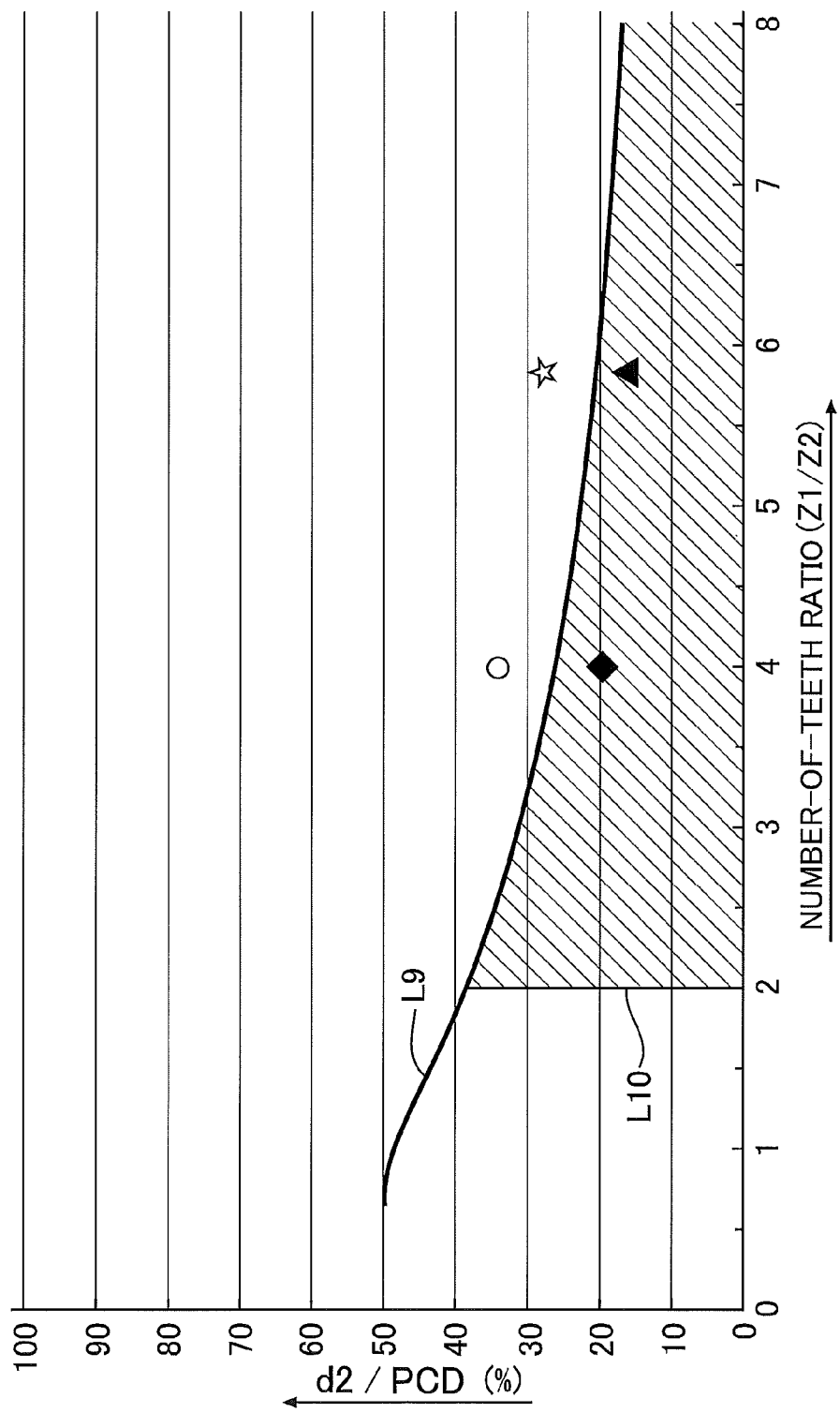
FIG. 15 is a graph showing a relationship between the shaft diameter/pitch cone distance ratio and the number-of-teeth ratio where the number of teeth of the pinion is set at 12.

Furthermore, for reference, a black diamond in FIG. 15 represents an example where when the number Z2 of teeth of the pinion P is 12, the number-of-teeth ratio Z1/Z2 and d2/PCD are set at 48/12 and 20.00%, respectively, and a black triangle in FIG. 15 represents an example where when the number Z2 of teeth of the pinion P is 12, the number-of-teeth ratio Z1/Z2 and d2/PCD are set at 70/12 and 16.67%, respectively. A result of a simulation for strength analysis on these examples has confirmed that the gear strength equal to or greater than those of the conventional differential devices (more specifically, the gear strength equal to or greater than 87% of the gear strength of the reference differential device D') were obtained. Moreover, these examples fall within the specific area, as shown in FIG. 15.

As comparative examples, let us show examples which do not fall within the specific area. A white star in FIG. 13 represents an example where when the number Z2 of teeth of the pinion P is for example 10, the number-of-teeth ratio Z1/Z2 and d2/PCD are set at 58/10 and 27.50%, respectively, and a white circle in FIG. 13 represents an example where when the number Z2 of teeth of the pinion P is for example 10, the number-of-teeth ratio Z1/Z2 and d2/PCD are set at 40/10 and 34.29%, respectively. A white star in FIG. 15 represents an example where when the number Z2 of teeth of the pinion P is for example 12, the number-of-teeth ratio Z1/Z2 and d2/PCD are set at 70/12 and 27.50%, respectively, and a white circle in FIG. 15 represents an example where when the number Z2 of teeth of the pinion P is for example 12, the number-of-teeth ratio Z1/Z2 and d2/PCD are set at 48/12 and 34.29%, respectively. A result of a simulation for strength analysis on these examples has confirmed that the gear strength equal to or greater than those of the conventional differential devices (more specifically, the gear strength equal to or greater than 87% of the gear strength of the reference differential device D') were not obtained. In other words, the above effects cannot be obtained from the examples which do not fall within the specific area.

Although the embodiments of the present invention have been described, the present invention is not limited to the embodiments. Various design changes can be made to the present invention within the scope not departing from the gist of the present invention.

For example, the foregoing embodiments have been shown in which the lubricant oil scattered randomly inside the transmission case 1 naturally flows into the inside of each of the cover portion C, C' through the lightening portions 8. However, lubricant oil splashed in a specific direction inside the transmission case 1 in accordance with the rotation of the differential device D, or lubricant oil dropped from a ceiling portion onto specific parts of the transmission case 1 may be made to actively flow in through the lightening portions 8. Otherwise, lubricant oil may be forced to flow in through the lightening portions 8 using a lubricant oil pump.

In addition, although the foregoing embodiments have been shown in which the lightening portions 8 are formed in the side wall portion Cs of at least one of the cover portions C, C', no lightening portion 8 may be formed in the side wall portions Cs of both the left and right cover portions C, C' and such side wall portions Cs respectively may cover the entire back surfaces of the side gears S.

Furthermore, the foregoing embodiments have been shown in which the oil passages from the lightening portions 8 to the oil guide grooves 17 formed in the side wall portions Cs of the cover portions C, C' are provided as the oil passages for guiding the lubricant oil to the outsides of the side gears S. Nevertheless, oil passages of different types may be carried out instead of, or in addition to, such lightening portions 8 (the oil guide grooves 17). For example, oil passages of one different type may be spiral grooves formed in at least one of the fitting surfaces between the shaft portions Sj of the side gears S and the boss portions Cb of the cover portions C, C' so that the lubricant oil is guided from the outer sides of the cover portions C, C' to the outer side surfaces of the side gears S via the spiral grooves in conjunction with relative rotation between the shaft portions Sj and the boss portions Cb. Oil passages of another different type may be through oil passages which are formed in the side wall portions Cs of the cover portions C, C' separately from the lightening portions 8 so that the lubricant oil is guided from the outer sides of the cover portions C, C' to the outer side surfaces of the side gears S via the through oil passages.

Furthermore, although the foregoing embodiments where the input member I integrally includes the input tooth portion Ig have been shown, a ring gear which is formed separately from the input member I may be fixed to the input member I later instead of the input tooth portion Ig. Moreover, the input member of the present invention may have a structure which includes neither the input tooth portion Ig nor the ring gear. For example, the input member I may be operatively connected to a drive member (for example, an output member of a planetary gear mechanism or a reduction gear mechanism, a driven wheel of an endless transmission belt-type transmission mechanism and the like) situated upstream of the input member I on the power transmission passage so that the rotational driving force is inputted into the input member I.

Besides, although the foregoing embodiments have been shown in which the back surfaces of the pair of side gears S are covered with the pair of cover portions C, C', the present invention may be carried out as such that the back surface of only one side gear S is provided with the cover portion. In this case, for example, the drive member situated on the upstream side of the power transmission passage may be disposed on a side of the other side gear provided with no cover portion so that the drive member and the input member are operatively connected to each other on the other side of the side gear provided with no cover portion.

In addition, although the foregoing embodiments have been shown in which the differential device D allows the difference in rotation between the left and right axles, the differential device of the present invention may be carried out as a center differential configured to absorb the difference in rotation between front wheels and rear wheels.

What is claimed is:

1. A differential device which distributively transmits rotational force from an input member to a pair of output shafts via a pair of side gears, the input member supporting a pinion support portion that supports a pinion thereon, the pinion being rotatable together with the pinion support portion,
   the side gears each having a tooth portion in mesh with the pinion in an outer peripheral portion of the side gear, wherein the side gears each include:
      a shaft portion connected to a corresponding one of the pair of output shafts; and
      an intermediate wall portion integrally connecting the shaft portion and the tooth portion, the intermediate wall portion separated outward from the shaft portion in a radial direction of the input member and being formed in a substantially flat shape, the differential device further comprising:
      a cover portion including a side wall portion which covers an outer side surface of at least one of the side gears, and which is connected to the input member so as to rotate integrally with the input member; and
      a washer installed between an inner side surface of the side wall portion and the outer side surface of the one of the side gears,
   wherein a through oil passage is formed in the intermediate wall portion of at least one of the side gears, ends of the through oil passage being respectively opened in an inner side surface and an outer side surface of the intermediate wall portion,
   and wherein an opening of the through oil passage is partially occluded by the washer.

2. The differential device according to claim 1, wherein relative positions of the washer and the through oil passage are set such that at least an inner peripheral portion of the washer faces the opening of the through oil passage opened to the outer side surface of the intermediate wall portion.

3. The differential device according to claim 2, wherein a washer retaining groove, fitting and retaining the washer therein, is formed in at least one of the inner side surface of the side wall portion and the outer side surface of the side gear.

4. The differential device according to claim 2, wherein:
   the side wall portion includes a weight-reduction portion exposing the outer side surface of the side gear, and
   an oil guide groove is provided in a recess in the inner side surface of the side wall portion, the oil guide groove being capable of guiding flow of lubricant oil from a peripheral edge of the weight-reduction portion toward the washer and the through oil passage during rotation of the input member.

5. The differential device according to claim 3, wherein
the side wall portion includes a weight-reduction portion exposing the outer side surface of the side gear, and
an oil guide groove is provided in a recess in the inner side surface of the side wall portion, the oil guide groove being capable of guiding flow of lubricant oil from a peripheral edge of the weight-reduction portion toward the washer and the through oil passage during rotation of the input member.

6. A differential device which distributively transmits rotational force from an input member to a pair of output shafts via a pair of output gears, the input member supporting a differential gear support portion that supports a differential gear thereon, the differential gear being rotatable together with the differential gear support portion, the output gears each having a tooth portion in mesh with the differential gear in an outer peripheral portion of each of the output gears, wherein
the pair of output gears each include:
a shaft portion connected to a corresponding one of the pair of output shafts; and
an intermediate wall portion integrally connecting the shaft portion and the tooth portion, the intermediate wall portion separated outward from the shaft portion in a radial direction of the input member and being formed in a substantially flat shape, the differential device further comprising:
a cover portion including a side wall portion which covers an outer side surface of at least one of the side gears, and which is connected to the input member so as to rotate integrally with the input member; and
a washer installed between an inner side surface of the side wall portion and the outer side surface of the one of the side gears,
wherein a through oil passage is formed in the intermediate wall portion of at least the one of the output gears, both ends of the through oil passage being respectively opened in an inner side surface and an outer side surface of the intermediate wall portion,
wherein an opening of the through oil passage is partially occluded by the washer, and
wherein $$d2/PCD \leq 3.36 \cdot \left(\frac{1}{z1}\right)^{\frac{2}{3}} \cdot \sin\left(\tan^{-1}\frac{z1}{z2}\right)$$

is satisfied, and
Z1/Z2>2 is satisfied, where Z1, Z2, d2 and PCD denote the number of teeth of each of the output gears, the number of teeth of the differential gear, a diameter of the differential gear support portion and a pitch cone distance, respectively.

7. The differential device according to claim 6, wherein Z1/Z2≥4 is satisfied.

8. The differential device according to claim 6, wherein Z1/Z2≥5.8 is satisfied.

9. The differential device according to claim 6, wherein relative positions of the washer and the through oil passage are set such that at least an inner peripheral portion of the washer faces the opening of the through oil passage opened to the outer side surface of the intermediate wall portion.

10. The differential device according to claim 6, wherein a washer retaining groove, fitting and retaining the washer therein, is formed in at least one of the inner side surface of the side wall portion and the outer side surface of the output gear.

11. The differential device according to claim 9, wherein the side wall portion includes a weight-reduction portion exposing the outer side surface of the output gear, and an oil guide groove is provided in a recess in the inner side surface of the side wall portion, the oil guide groove being capable of guiding flow of lubricant oil from a peripheral edge of the weight-reduction portion toward the washer and the through oil passage during rotation of the input member.

12. The differential device according to claim 10, wherein the side wall portion includes a weight-reduction portion exposing the outer side surface of the output gear, and an oil guide groove is provided in a recess in the inner side surface of the side wall portion, the oil guide groove being capable of guiding flow of lubricant oil from a peripheral edge of the weight-reduction portion toward the washer and the through oil passage during rotation of the input member.

13. A differential device which distributively transmits rotational force from an input member to a pair of output shafts via a pair of side gears, the input member supporting a pinion support portion that supports a pinion thereon, the pinion being rotatable together with the pinion support portion,
the side gears each having a tooth portion in mesh with the pinion in an outer peripheral portion of the side gear, wherein the side gears each include:
a shaft portion connected to a corresponding one of the pair of output shafts; and
an intermediate wall portion integrally connecting the shaft portion and the tooth portion, the intermediate wall portion separated outward from the shaft portion in a radial direction of the input member and being formed in a substantially flat shape, the differential device further comprising:
a cover portion including a side wall portion which covers an outer side surface of at least one of the side gears, and which is connected to the input member so as to rotate integrally with the input member; and
a washer installed between an inner side surface of the side wall portion and the outer side surface of the one of the side gears, the washer having a radially inner portion,
wherein a through oil passage is formed in the intermediate wall portion of at least one of the side gears, ends of the through oil passage being respectively opened in an inner side surface and an outer side surface of the intermediate wall portion, an opening of the through oil passage being substantially aligned with the washer's radially inner portion,
and wherein the washer is operable to reduce or inhibit lubricant oil from flowing outwardly in a radial direction, along a clearance between the inner side surface of the cover portion and the outer side surface of the side gear.

14. The differential device according to claim 13, wherein relative positions of the washer and the through oil passage are set such that at least an inner peripheral portion of the washer faces the opening of the through oil passage opened to the outer side surface of the intermediate wall portion.

15. The differential device according to claim 14, wherein a washer retaining groove, fitting and retaining the washer therein, is formed in at least one of the inner side surface of the side wall portion and the outer side surface of the side gear.

16. The differential device according to claim 14, wherein:
- the side wall portion includes a weight-reduction portion exposing the outer side surface of the side gear, and
- an oil guide groove is provided in a recess in the inner side surface of the side wall portion, the oil guide groove being capable of guiding flow of lubricant oil from a peripheral edge of the weight-reduction portion toward the washer and the through oil passage during rotation of the input member.

* * * * *